(12) United States Patent
Bock et al.

(10) Patent No.: US 12,239,188 B2
(45) Date of Patent: Mar. 4, 2025

(54) ARTICLE OF FOOTWEAR HAVING A TEXTILE DISPLAY SYSTEM

(71) Applicant: PUMA SE, Herzogenaurach (DE)

(72) Inventors: Markus Bock, Herzogenaurach (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 56 days.

(21) Appl. No.: 18/218,539

(22) Filed: Jul. 5, 2023

(65) Prior Publication Data
US 2024/0008585 A1  Jan. 11, 2024

Related U.S. Application Data

(60) Provisional application No. 63/359,488, filed on Jul. 8, 2022.

(51) Int. Cl.
A43B 3/36 (2022.01)
A43B 3/38 (2022.01)
G02F 1/167 (2019.01)
G06F 1/16 (2006.01)
G09F 9/305 (2006.01)

(52) U.S. Cl.
CPC ............... A43B 3/36 (2022.01); A43B 3/38 (2022.01); G02F 1/167 (2013.01); G09F 9/305 (2013.01); G06F 1/163 (2013.01)

(58) Field of Classification Search
CPC .. A43B 3/36; A43B 3/38; G02F 1/167; G09F 9/305; D02G 3/441
See application file for complete search history.

(56) References Cited

U.S. PATENT DOCUMENTS

| | | | |
|---|---|---|---|
| 3,838,495 A | 10/1974 | Kuhnert | |
| 5,813,148 A * | 9/1998 | Guerra | A43B 1/0072 36/137 |
| 5,894,686 A * | 4/1999 | Parker | A43B 3/44 36/137 |
| 5,930,026 A | 7/1999 | Jacobson | |
| 6,118,426 A | 9/2000 | Albert | |
| 6,210,771 B1 | 4/2001 | Post | |
| 6,252,564 B1 | 6/2001 | Albert | |

(Continued)

FOREIGN PATENT DOCUMENTS

| | | |
|---|---|---|
| CN | 103572351 | 2/2014 |
| EP | 1517827 A1 | 3/2005 |

(Continued)

OTHER PUBLICATIONS

International Search Report with Written opinion of PCT/IB2023/056976 mailed Dec. 6, 2023 (16 pages).

Primary Examiner — Sardis F Azongha
(74) Attorney, Agent, or Firm — Quarles & Brady LLP

(57) ABSTRACT

An article of footwear includes an upper attached to a sole structure and a display system disposed on the upper. The display system includes a display portion, a control module, and a power source. The display portion includes a plurality of optoelectronic fibers. The control module is configured to communicate with the display portion. The power source provides electrical current to the control module and the plurality of optoelectronic fibers. The plurality of optoelectronic fibers each include a fabric layer disposed between a core electrode and an optoelectronic layer.

34 Claims, 13 Drawing Sheets

(56) References Cited

U.S. PATENT DOCUMENTS

| | | |
|---|---|---|
| 6,459,418 B1 | 10/2002 | Comiskey |
| 6,621,766 B2 | 9/2003 | Brewer |
| 6,639,578 B1 | 10/2003 | Comiskey |
| 7,592,276 B2 | 9/2009 | Hill |
| 7,728,811 B2 | 6/2010 | Albert |
| 8,769,836 B2 | 7/2014 | Donovan |
| 9,226,542 B2 | 1/2016 | Hartford |
| 9,392,844 B1* | 7/2016 | Burrell .................. A43B 23/24 |
| 9,776,041 B1 | 10/2017 | Lachwani |
| 10,081,887 B2* | 9/2018 | Manipatruni ......... D02G 3/441 |
| 10,268,096 B2 | 4/2019 | Posset |
| 10,393,165 B2 | 8/2019 | Kulzer |
| 10,993,503 B2 | 5/2021 | Truitt |
| 11,154,111 B2 | 10/2021 | Donovan |
| 2004/0119681 A1 | 6/2004 | Albert |
| 2007/0049147 A1 | 3/2007 | Hill |
| 2007/0285385 A1 | 12/2007 | Albert |
| 2010/0289971 A1* | 11/2010 | Odland .................... A43B 3/00 36/83 |
| 2012/0199222 A1 | 8/2012 | Sullivan |
| 2013/0033378 A1 | 2/2013 | Donovan |
| 2015/0221244 A1 | 8/2015 | Miller |
| 2019/0112733 A1* | 4/2019 | Abouraddy ............... D01F 8/00 |
| 2020/0180264 A1 | 6/2020 | Thostenson |
| 2020/0326318 A1 | 10/2020 | Keller |

FOREIGN PATENT DOCUMENTS

| | | |
|---|---|---|
| EP | 1582283 A1 | 10/2005 |
| EP | 3069279 A1 | 9/2016 |
| EP | 3535034 A4 | 9/2020 |
| WO | 2012037445 A3 | 7/2012 |

\* cited by examiner

ARTICLE OF FOOTWEAR HAVING A TEXTILE DISPLAY SYSTEM

CROSS REFERENCE TO RELATED APPLICATIONS

This application claims the benefit of and priority to U.S. Provisional Application No. 63/359,488, filed on Jul. 8, 2022, which is incorporated by reference herein in its entirety.

BACKGROUND

1. Field of the Invention

The present disclosure relates generally to an article of footwear including a display system.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and an insole. The outsole may provide traction to a bottom surface of the sole, and the midsole may be attached to an inner surface of the outsole, and may provide cushioning or added stability to the sole. For example, a sole may include a particular foam material that may increase stability at one or more desired locations along the sole, or a foam material that may reduce stress or impact energy on the foot or leg when a user is running, walking, or engaged in another activity. The sole may also include additional components, such as plates, embedded with the sole to increase the overall stiffness of the sole and reduce energy loss during use.

The upper generally extends upward from the sole and defines an interior cavity that completely or partially encases a foot. In most cases, the upper extends over the instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of shoe tightness. The tongue may further be manipulatable by a user to permit entry or exit of a foot from the internal space or cavity. In addition, the lacing system may allow a user to adjust certain dimensions of the upper or the sole, thereby allowing the upper to accommodate a wide variety of foot types having varying sizes and shapes.

The upper of many shoes may comprise a wide variety of materials, which may be utilized to form the upper and chosen for use based on one or more intended uses of the shoe. The upper may also include portions comprising varying materials specific to a particular area of the upper. For example, added stability may be desirable at a front of the upper or adjacent a heel region to provide a higher degree of resistance or rigidity. In contrast, other portions of a shoe may include a soft woven textile to provide an area with stretch-resistance, flexibility, air-permeability, or moisture-wicking properties.

However, in many cases, articles of footwear are provided with materials provided for visual communication and aesthetic purposes. For example, articles of footwear may be provided with reflective materials for improving visibility of a user. There is a continuing need for articles of footwear with materials provided for visual communication and aesthetic purposes.

SUMMARY

An article of footwear, as described herein, may have various configurations. The article of footwear may have an upper and a sole structure connected to the upper.

In some aspects, an article of footwear includes an upper attached to a sole structure and a display system disposed on the upper. The display system includes a display portion, a control module, and a power source. The display portion includes a plurality of optoelectronic fibers. The control module is configured to communicate with the display portion. The power source provides electrical current to the control module and the plurality of optoelectronic fibers. The plurality of optoelectronic fibers each include a fabric layer disposed between a core electrode and an optoelectronic layer.

In some aspects, a display system for an article of footwear includes an upper and a sole structure. The upper includes a first yarn and a second yarn. The first yarn comprises an optoelectronic layer and the second yarn comprises a core electrode. A textile is formed by the first yarn and the second yarn. An electrical contact is provided on the upper. A sole structure includes an electrical circuit having a power source, a control module, and a conductive lead in communication with a periphery of the sole structure. The periphery of the sole structure is joined with a periphery of the upper, and the electrical contact of the upper is operably connected to the power source.

In some aspects, a display system for an article of footwear includes a display device, a control module, and a power source. The display device includes a yarn comprising electrophoretic ink and the display device is visible from the exterior of the article of footwear. The control module is configured to communicate with the display device and is operable from the exterior of the article of footwear. The power source is embedded within a midsole of the article of footwear, wherein the midsole includes a plate. The display device is electrically connected with the control module.

In some aspects, a method of assembling a display for an article of footwear includes providing a first yarn and a second yarn, the first yarn having an electrically conductive core. The method further includes coating the first yarn with an electrophoretic ink and a conductive material, forming the first yarn and the second yarn into a textile, and applying the textile to a substrate to form the display. The substrate includes a non-conductive material. The method further comprises arranging the display to form at least a portion of an upper of the article of footwear and connecting a power source and a control module to a contact positioned on the upper to operate the display.

In some aspects, a method of assembling a display for an article of footwear includes providing a first layer of non-conductive material, applying a second layer comprising a conductive material to the first layer, applying a third layer comprising electrophoretic ink to the second layer, and applying a fourth layer comprising a conductive material to the third layer. The first layer, the second layer, the third layer and the fourth layer comprise the display, and the third layer comprises a textile layer. The display is connected to a power source and a control module, which is provided in a sole structure of an article of footwear.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
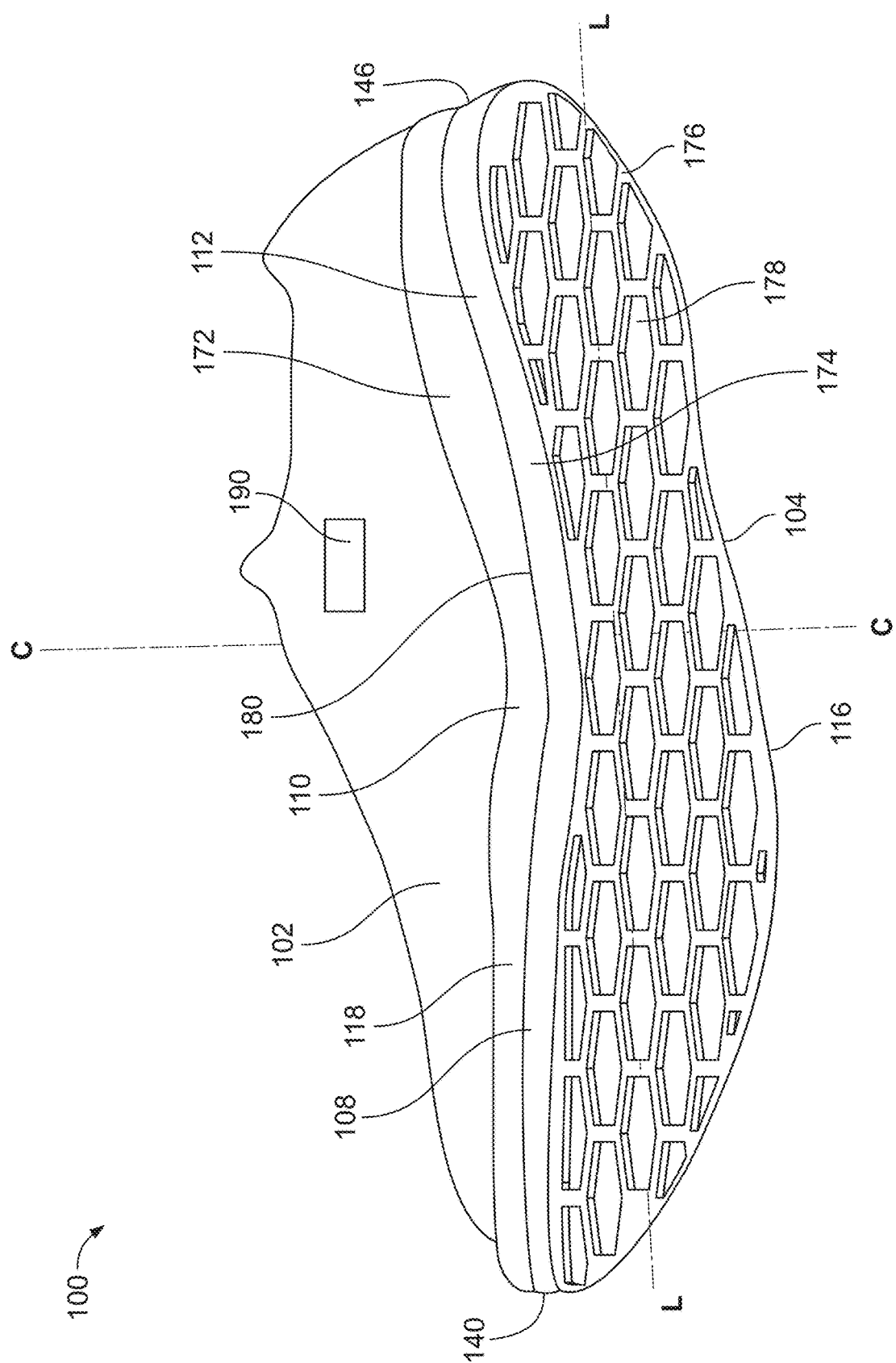
FIG. 1 is a perspective view of a bottom and medial side of an article of footwear configured as a right shoe that includes an upper and a sole structure, with the upper having a display portion, according to an embodiment of the disclosure.

The following discussion and accompanying figures disclose various embodiments or configurations of a shoe and a sole structure. Although embodiments of a shoe or sole structure are disclosed with reference to a sports shoe, such as a running shoe, tennis shoe, basketball shoe, etc., concepts associated with embodiments of the shoe or the sole structure may be applied to a wide range of footwear and footwear styles, including cross-training shoes, football shoes, golf shoes, hiking shoes, hiking boots, ski and snowboard boots, soccer shoes and cleats, walking shoes, and track cleats, for example. Concepts of the shoe or the sole structure may also be applied to articles of footwear that are considered non-athletic, including dress shoes, sandals, loafers, slippers, and heels. In addition to footwear, particular concepts described herein may also be applied and incorporated in other types of apparel or other athletic equipment, including helmets, padding or protective pads, shin guards, and gloves. Even further, particular concepts described herein may be incorporated in cushions, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to an article of footwear and/or specific components of the article of footwear, such as an upper and/or a sole or sole structure. The upper may comprise a knitted textile, a woven textile, and/or a non-woven textile. The knitted textile may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knitted textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

Figure 2:
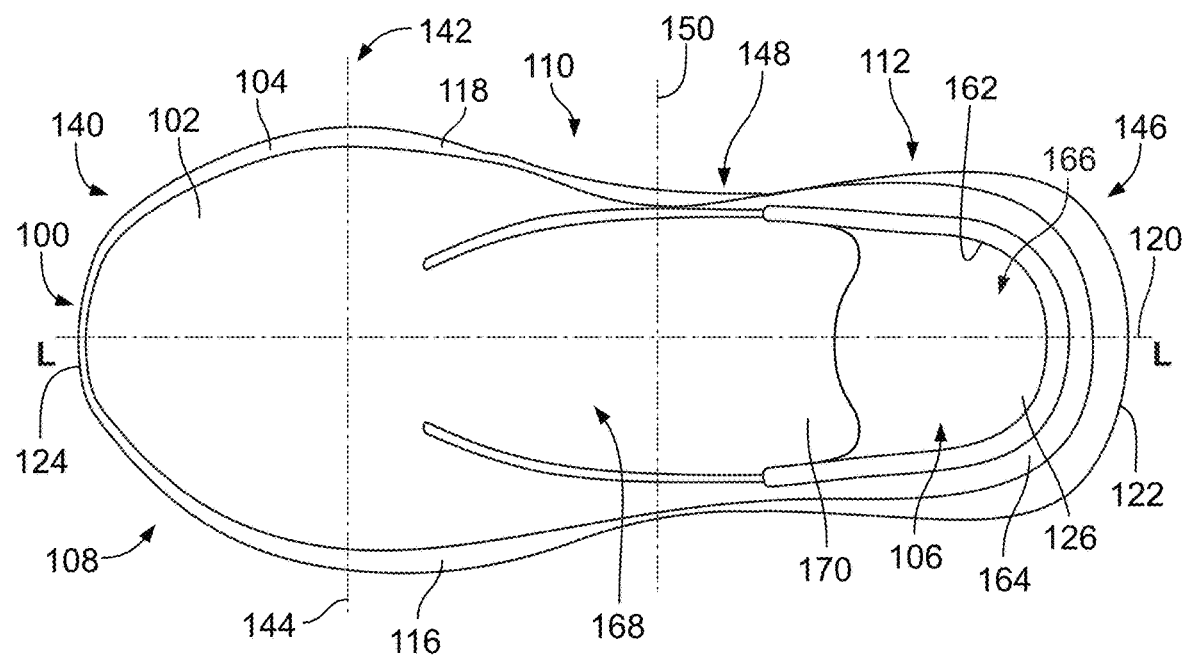
FIG. 2 is a top view of the article of footwear of FIG. 1 configured as a left shoe.
Figure 3:
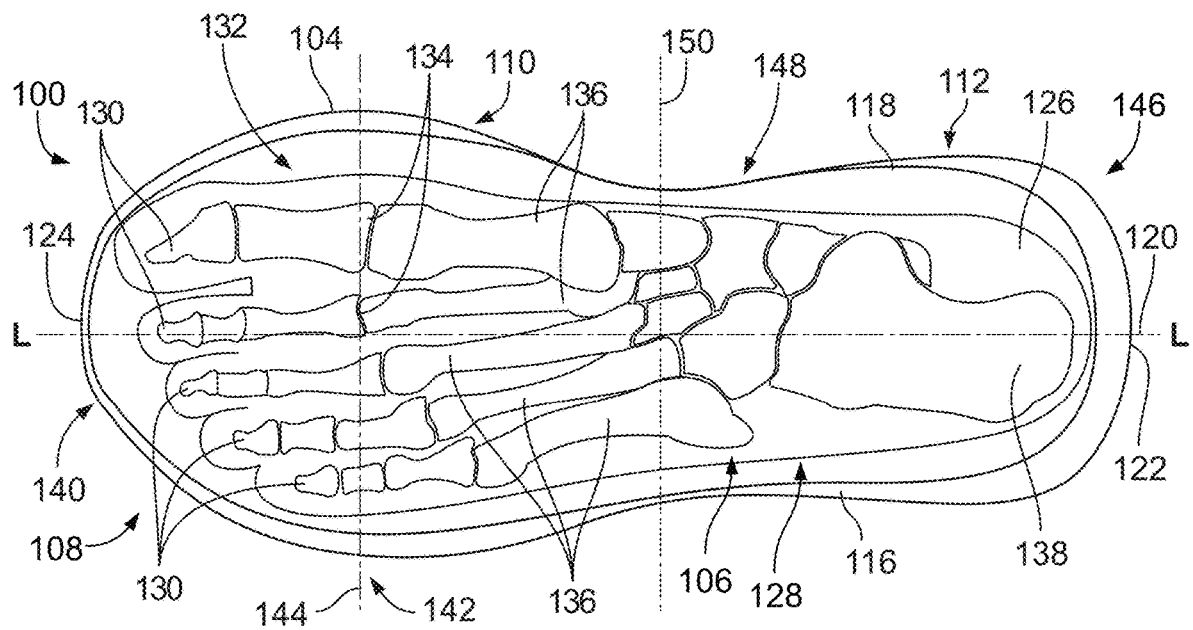
FIG. 3 is a top plan view of the article of footwear of FIG. 2, with an upper removed and a user's skeletal foot structure overlaid thereon.

FIGS. 1-3 depict an exemplary embodiment of an article of footwear 100 including an upper 102 and a sole structure 104. The upper 102 is attached to the sole structure 104 and together define an interior cavity 106 (see FIGS. 2 and 3) into which a foot may be inserted. For reference, the article of footwear 100 defines a forefoot region 108, a midfoot region 110, and a heel region 112 (see FIGS. 2 and 3). The forefoot region 108 generally corresponds with portions of the article of footwear 100 that encase portions of the foot that includes the toes, the ball of the foot, and joints connecting the metatarsals with the toes or phalanges. The midfoot region 110 is proximate and adjoining the forefoot region 108, and generally corresponds with portions of the article of footwear 100 that encase the arch of the foot, along with the bridge of the foot. The heel region 112 is proximate and adjoining the midfoot region 110 and generally corresponds with portions of the article of footwear 100 that encase rear portions of the foot, including the heel or calcaneus bone, the ankle, and/or the Achilles tendon (not shown).

Referring to FIG. 1, the sole structure 104 is connected or secured to the upper 102 and extends between a foot of a user and the ground when the article of footwear 100 is worn by the user. The sole structure 104 may include one or more components, which may include an outsole, a midsole, a heel, a vamp, and/or an insole. For example, in some embodiments, a sole structure may include an outsole that provides structural integrity to the sole structure, along with providing traction for a user, a midsole that provides a cushioning system, and an insole that provides support for an arch of a user. In addition, the insole may be a strobel board, a forefoot board, a lasting board, etc., or a combination thereof, and the insole may be provided between the upper 102 and the sole structure 104, or the insole may be provided as part of the upper 102.

In some embodiments, the sole structure 104 includes an outsole 174 that provides abrasion-resistance and traction with the ground surface and a plate 180 that provides lever-like assistance and toe stabilization. The plate 180 may be formed from carbon fiber or other composite materials. In some aspects, the plate 180 is configured to harness kinetic energy to leverage momentum through a user's foot strike, allowing the users to engage in athletic activities with less fatigue.

Furthermore, the insole can be positioned within the interior cavity 106 of the upper 102, which can be in direct contact with a user's foot while an article of footwear 100 is being worn. Moreover, the upper 102 may also include a liner (not shown) that can increase comfort, for example, by reducing friction between the foot of the user and the upper 102, the sole structure 104, the insole, or the like, and/or by providing moisture wicking properties. The liner may line the entirety of the interior cavity 106 or only a portion thereof. In some embodiments, a binding (not shown) may surround an opening of the interior cavity 106 to secure the liner to the upper 102 and/or to provide an aesthetic element on the article of footwear 100.

Still referring to FIG. 1, the midsole 172 may be individually constructed from a thermoplastic material, such as polyurethane (PU), for example, and/or an ethylene-vinyl acetate (EVA), copolymers thereof, or a similar type of material. In other embodiments, the midsole 172 may be an EVA-Solid-Sponge ("ESS") material, an EVA foam (e.g., PUMA® ProFoam Lite™, IGNITE Foam), polyurethane, polyether, an olefin block copolymer, organosheets, a thermoplastic material (e.g., a thermoplastic polyurethane, a thermoplastic elastomer, a thermoplastic polyolefin, etc.), or a supercritical foam. The midsole 172 may be a single polymeric material or may be a blend of materials, such as an EVA copolymer, a thermoplastic polyurethane, a polyether block amide (PEBA) copolymer, and/or an olefin block copolymer. One example of a PEBA material is PEBAX®. In some embodiments, the midsole 172 is manufactured by a process involving injection molding, vulcanization, printing layer by layer, i.e., additive manufacturing systems or methods, and the like.

In embodiments where the midsole 172 is formed from a supercritical foaming process, the supercritical foam may comprise micropore foams or particle foams, such as a TPU, EVA, PEBAX®, or mixtures thereof, manufactured using a process that is performed within an autoclave, an injection molding apparatus, or any sufficiently heated/pressurized container that can process the mixing of a supercritical fluid (e.g., $CO_2$, $N_2$, or mixtures thereof) with a material (e.g., TPU, EVA, polyolefin elastomer, or mixtures thereof) that is preferably molten. During an exemplary process, a solution of supercritical fluid and molten material is pumped into a pressurized container, after which the pressure within the container is released, such that the molecules of the supercritical fluid rapidly convert to gas to form small pockets within the material and cause the material to expand into a foam. In further embodiments, the midsole 172 may be formed using alternative methods known in the art, including the use of an expansion press, an injection machine, a pellet expansion process, a cold foaming process, a compression molding technique, die cutting, or any combination thereof. For example, the midsole 172 may be formed using a process that involves an initial foaming step in which supercritical gas is used to foam a material and then compression molded or die cut to a particular shape.

Referring to FIGS. 2 and 3, the article of footwear 100 also defines a lateral side 116 and a medial side 118. When a user is wearing the shoes, the lateral side 116 corresponds with an outside-facing portion of the article of footwear 100 while the medial side 118 corresponds with an inside-facing portion of the article of footwear 100. As such, the article of footwear 100 has opposing lateral sides 116 and medial sides 118. The medial side 118 and the lateral side 116 adjoin one another along a longitudinal central plane or a central axis 120 of the article of footwear 100, which is coplanar with the longitudinal axis L of FIG. 1. As will be further discussed herein, the longitudinal central plane or the central axis 120 may demarcate a central, intermediate axis between the medial side 118 and the lateral side 116 of the article of footwear 100. Put differently, the longitudinal plane or the central axis 120 may extend between a rear, proximal end 122 of the article of footwear 100 and a front, distal end 124 of the article of footwear 100 and may continuously define a middle of an insole 126, the sole structure 104, and/or the upper 102 of the article of footwear 100, i.e., the longitudinal plane or the central axis 120 is a straight axis extending through the rear, proximal end 122 of the heel region 112 to the front, distal end 124 of the forefoot region 108.

Still referring to FIGS. 2 and 3, the article of footwear 100 may be defined by the forefoot region 108, the midfoot region 110, and the heel region 112. The forefoot region 108 may generally correspond with portions of the article of footwear 100 that encase portions of a foot 128 that include the toes or phalanges 130, the ball of the foot 132, and one or more of the joints 134 that connect the metatarsals 136 of the foot 128 with the toes or phalanges 130. The midfoot region 110 is proximate and adjoins the forefoot region 108. The midfoot region 110 generally corresponds with portions of the article of footwear 100 that encase an arch of a foot 128, along with a bridge of the foot 128. The heel region 112 is proximate to the midfoot region 110 and adjoins the midfoot region 110. The heel region 112 generally corresponds with portions of the article of footwear 100 that encase rear portions of the foot 128, including the heel or calcaneus bone 138, the ankle (not shown), and/or the Achilles tendon (not shown).

Still referring to FIGS. 2 and 3, the forefoot region 108, the midfoot region 110, the heel region 112, the medial side 118, and the lateral side 116 are intended to define boundaries or areas of the article of footwear 100. To that end, the forefoot region 108, the midfoot region 110, the heel region 112, the medial side 118, and the lateral side 116 generally characterize sections of the article of footwear 100. Certain aspects of the disclosure may refer to portions or elements that are coextensive with one or more of the forefoot region 108, the midfoot region 110, the heel region 112, the medial side 118, and/or the lateral side 116. Further, both the upper 102 and the sole structure 104 may be characterized as having portions within the forefoot region 108, the midfoot region 110, the heel region 112, and/or along the medial side 118 and/or the lateral side 116. Therefore, the upper 102 and the sole structure 104, and/or individual portions of the upper 102 and the sole structure 104, may include portions thereof that are disposed within the forefoot region 108, the midfoot region 110, the heel region 112, and/or along the medial side 118 and/or the lateral side 116.

Still referring to FIGS. 2 and 3, the forefoot region 108, the midfoot region 110, the heel region 112, the medial side 118, and the lateral side 116 are shown in detail. The forefoot region 108 extends from a toe end 140 to a widest portion 142 of the article of footwear 100. The widest portion 142 is defined or measured along a first line 144 that is perpendicular with respect to the central axis 120 that extends from a distal portion of the toe end 140 to a distal portion of a heel end 146, which is opposite the toe end 140. The midfoot region 110 extends from the widest portion 142 to a thinnest portion 148 of the article of footwear 100. The thinnest portion 148 of the article of footwear 100 is defined as the thinnest portion of the article of footwear 100 measured across a second line 150 that is perpendicular with respect to the central axis 120. The heel region 112 extends from the thinnest portion 148 to the heel end 146 of the article of footwear 100.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 108, the midfoot region 110, the heel region 112, the medial side 118, and/or the lateral side 116 as described herein may vary between articles of footwear. However, aspects of the article of footwear 100 and individual components thereof, may also be described with reference to exact areas or portions of the article of footwear 100 and the scope of the appended claims herein may incorporate the limitations associated with these boundaries of the forefoot region 108, the midfoot region 110, the heel region 112, the medial side 118, and/or the lateral side 116 discussed herein.

Still referring to FIGS. 2 and 3, the medial side 118 begins at the distal, toe end 140 and bows outward along an inner side of the article of footwear 100 along the forefoot region 108 toward the midfoot region 110. The medial side 118 reaches the first line 144, at which point the medial side 118 bows inward, toward the central axis 120. The medial side 118 extends from the first line 144, i.e., the widest portion 142, toward the second line 150, i.e., the thinnest portion 148, at which point the medial side 118 enters into the midfoot region 110, i.e., upon crossing the first line 144. Once reaching the second line 150, the medial side 118 bows outward, away from the longitudinal, central axis 120, at which point the medial side 118 extends into the heel region 112, i.e., upon crossing the second line 150. The medial side 118 then bows outward and then inward toward the heel end 146, and terminates at a point where the medial side 118 meets the longitudinal, central axis 120.

The lateral side 116 also begins at the distal, toe end 140 and bows outward along an outer side of the article of footwear 100 along the forefoot region 108 toward the midfoot region 110. The lateral side 116 reaches the first line 144, at which point the lateral side 116 bows inward, toward the longitudinal, central axis 120. The lateral side 116 extends from the first line 144, i.e., the widest portion 142, toward the second line 150, i.e., the thinnest portion 148, at which point the lateral side 116 enters into the midfoot region 110, i.e., upon crossing the first line 144. Once reaching the second line 150, the lateral side 116 bows outward, away from the longitudinal, central axis 120, at which point the lateral side 116 extends into the heel region 112, i.e., upon crossing the second line 150. The lateral side 116 then bows outward and then inward toward the heel end 146, and terminates at a point where the lateral side 116 meets the longitudinal, central axis 120.

Still referring to FIGS. 2 and 3, the upper 102 extends along the lateral side 116 and the medial side 118, and across the forefoot region 108, the midfoot region 110, and the heel region 112 to house and enclose a foot of a user. When fully assembled, the upper 102 also includes an interior surface 162 and an exterior surface 164. The interior surface 162 faces inward and generally defines the interior cavity 106, and the exterior surface 164 of the upper 102 faces outward and generally defines an outer perimeter or boundary of the upper 102. The upper 102 also includes an opening 166 that is at least partially located in the heel region 112 of the article of footwear 100, which provides access to the interior cavity 106 and through which a foot 128 may be inserted and removed. In some embodiments, the upper 102 may also include an instep region 168 that extends from the opening 166 in the heel region 112 over an area corresponding to an instep of a foot 128 to an area proximate the forefoot region 108. The instep region 168 may comprise an area similar to where a tongue 170 of the present embodiment is disposed. In some embodiments, the upper 102 does not include the tongue 170, i.e., the upper 102 is tongueless.

In the illustrated embodiment, the sole structure 104 includes a midsole 172 and an outsole 174. The outsole 174 may define a bottom end or bottom surface 176 of the sole structure 104 across the heel region 112, the midfoot region 110, and the forefoot region 108. Further, the outsole 174 may be a ground-engaging portion or include a ground-engaging surface of the sole structure 104 and may be opposite of the insole thereof. As illustrated in FIG. 1, the bottom surface 176 of the outsole 174 may include a tread pattern 178 that can include a variety of shapes and configurations. The outsole 174 may be formed from one or more materials to impart durability, wear-resistance, abrasion resistance, or traction to the sole structure 104. In some embodiments, the outsole 174 may be formed from any kind of elastomer material, e.g., rubber, including thermoset elastomers or thermoplastic elastomers, or a thermoplastic material, e.g., thermoplastic polyurethane (TPU). In some embodiments, the outsole 174 may define a shore A hardness up to 95. In addition, the outsole 174 may be manufactured by a process involving injection molding, vulcanization, printing layer by layer, i.e., additive manufacturing systems or methods, and the like.

Many conventional footwear uppers are formed from multiple elements, e.g., textiles, polymer foam, polymer sheets, leather, and synthetic leather, which are joined through bonding or stitching at a seam. In some embodiments, the upper 102 of the article of footwear 100 is formed from a knitted textile or a woven textile. In various embodiments, the knitted textile may incorporate various types of yarn that may provide different properties to an upper. For example, one area of the upper 102 may be formed from a first type of yarn that imparts a first set of properties, and another area of the upper 102 may be formed from a second type of yarn that imparts a second set of properties. Using this configuration, properties of the upper 102 may vary throughout the upper 102 by selecting specific yarns for different areas of the upper 102. Referring to FIG. 1, the article of footwear 100 includes a display portion 190 that utilizes visual display technology. The display portion 190 may be referenced herein as "visual display" or a "visual display portion," an "optoelectronic display" or an "optoelectronic display portion," a "display screen," a "display device," and a "color change portion."

Examples of visual display technologies may be optoelectronic displays that include, but are not limited to: electrochemical transistor based visual display technologies, LCD panel technologies, LED screen technologies, fiber optic technologies, electrochromographic materials (including photonic lattices or crystals), electronic paper technologies (including electrophoretic ink technologies, electrowetting technologies and electrofluidic technologies), electroluminescent strips, as well as other visual display technologies. In some embodiments, visual display portions can be associated with electronic paper technologies using electrophoretic ink. Several examples are disclosed in U.S. Pat. Nos. 7,535,624; 7,528,822; 7,420,549; 7,167,155; 7,201,952; 6,987,603; 6,922,276; 6,864,875, and 6,639,578, each of which is hereby incorporated by reference in their entirety.

In some embodiments, visual display portions can be associated with flexible electronic paper technologies using electrophoretic ink which retain a visual display after removal of applied power. Examples are disclosed in any of the following: U.S. Pat. Nos. 8,502,788; 7,944,597; 7,675,672; 7,195,170; and 6,936,190, the entirety of each being hereby incorporated by reference. In some embodiments, visual display portions can be associated with electronically controllable visually dynamic textiles or flexible substrates as are disclosed in U.S. Patent Publication Number 2003/0224155, the entirety of which is hereby incorporated by reference.

Figure 4:
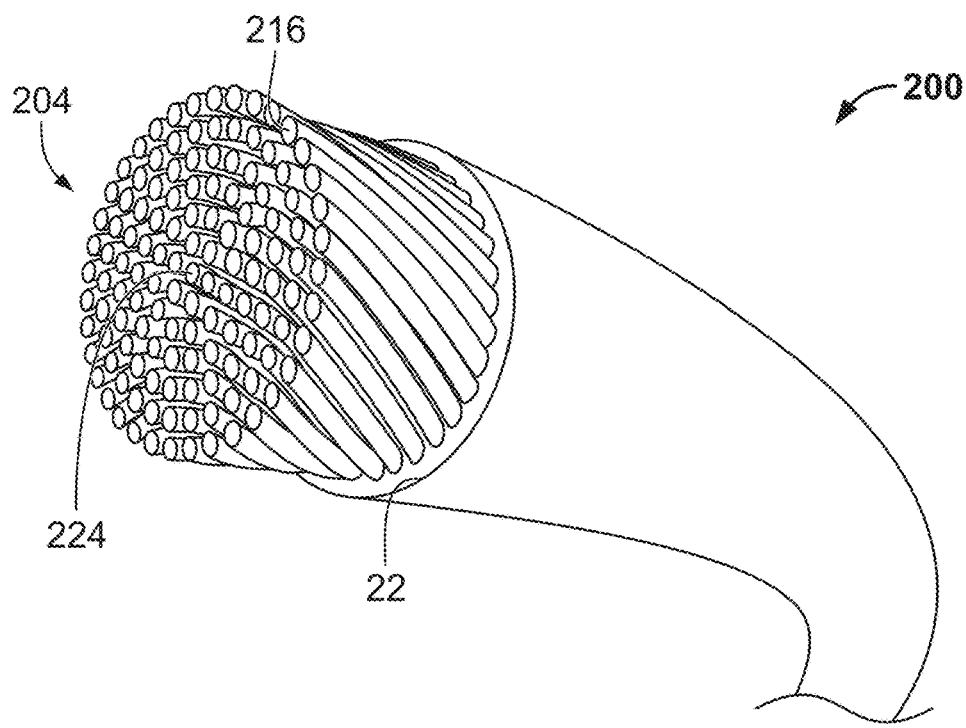
FIG. 4 is a schematic representation of a perspective view of a yarn having a multifilament core.
Figure 5:
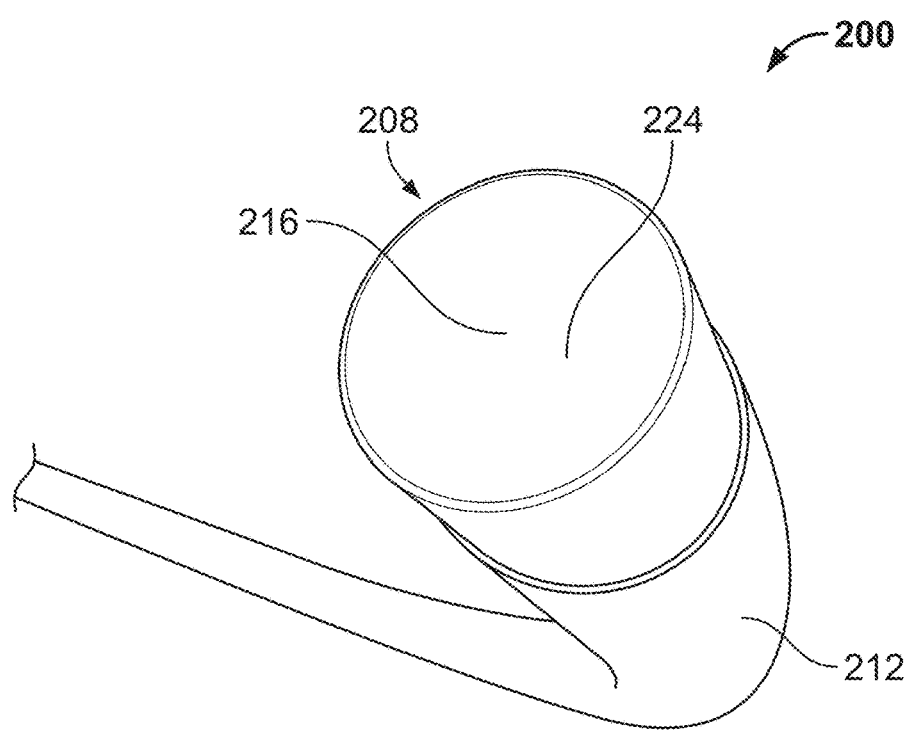
FIG. 5 is a schematic representation of a perspective view of a yarn having a monofilament core.

FIGS. 4 and 5 depict embodiments of a yarn 200 for use with the article of footwear 100 having the display portion 190, such as part of the upper 102. The yarn 200 may have a multifilament core 204, as depicted in FIG. 4, or the yarn 200 may have a monofilament core 208, as depicted in FIG. 5. The yarn 200 may have various properties such as, e.g., material, diameter, denier, tear strength, coating, and color. Referring to FIG. 4, the multifilament core 204 includes an outer layer 212 that surrounds a plurality of filaments 216 bundled together within the outer layer 212. In some embodiments, the plurality of filaments 216 includes an electrically conductive filament or core electrode 224. In some embodiments, more than one of the filaments 216 is electrically conductive and, thus, the core electrode 224 comprises multiple filaments 216. The outer layer 212 may be comprised of an elastomer coating, a polymer coating, textiles, or yarns of a different material. The plurality of filaments 216 may be bundled and protected by the outer layer 212. The plurality of filaments 216 may be formed from metal, polymer, plastics, natural materials, or the like.

As illustrated in FIG. 5, the yarn 200 having the monofilament core 208 may comprise one filament 216 enclosed within the outer layer 212. In some embodiments, the monofilament core 208 may be electrically conductive, such that the monofilament core 208 comprises the core electrode 224. The core electrode 224 may be formed of metal or metalloids, such as, e.g., silver, gold, aluminum, zinc, or copper. The electrical conductivity is a result of the movement of electrically charged particles in metals. The atoms within the metallic core are characterized by the presence of a valence electrons. The valence electrons are electrons in the outer shell of an atom that are free electrons that enable the metals to conduct an electric current. The conduction in metals must abide Ohm's Law, which states that the current is directly proportional to the electric field applied to the metal.

Figure 6:
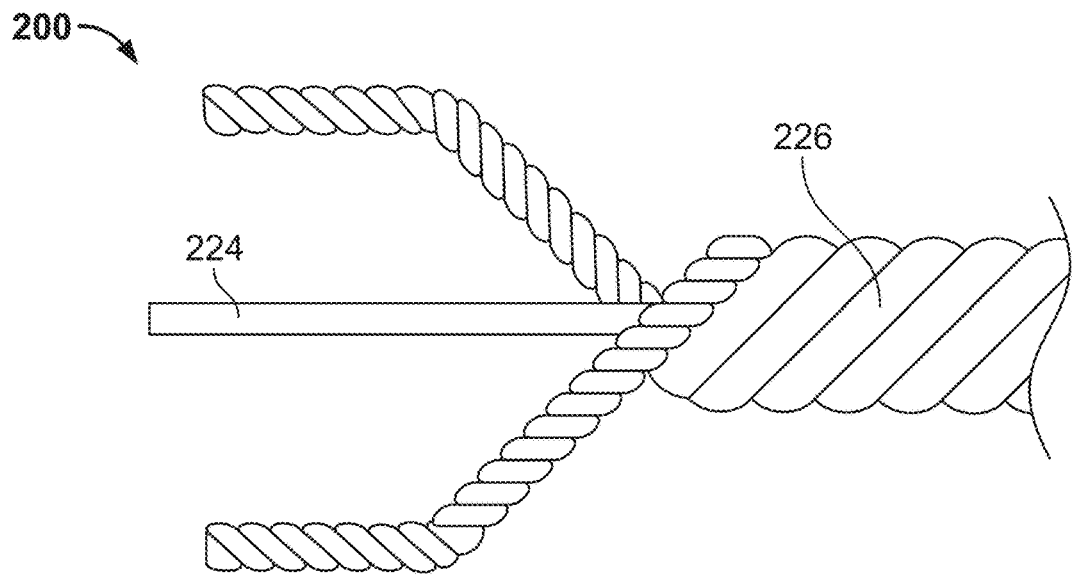
FIG. 6 is a schematic representation of a top plan view of a yarn comprising a conductive core covered with fabric.

Referring to FIG. 6, the yarn 200 may be formed by wrapping or winding fabric strands or fibers 226 around the core electrode 224. The fabric strands 226 may be provided as a fabric layer comprising cotton, elastene or stretch polyester, rayon, wool, nylon, or the like. In some embodiments, the fabric strands 226 comprise natural polymers, such as, e.g., rubber, polysaccharides, starch, glycogen, proteins or the like, or synthetic polymers that generally have petroleum-derived ingredients, such as, e.g., polyurethane (TPU), polyethylene (PE), polystyrene (PS), polyamides (Nylon), polylactic acid (PLA), polypropylene (PP), polyvinyl chloride (PVC), and polycarbonate (PC). In the illustrated embodiments, the monofilament core 208 is depicted with the core electrode 224 being enclosed by the fiber strands 226. It will be appreciated that the multifilament core 204 may be similarly formed by wrapping the fiber strands 226 around the plurality of filaments 216, at least one of which includes the core electrode 224.

Figure 7:
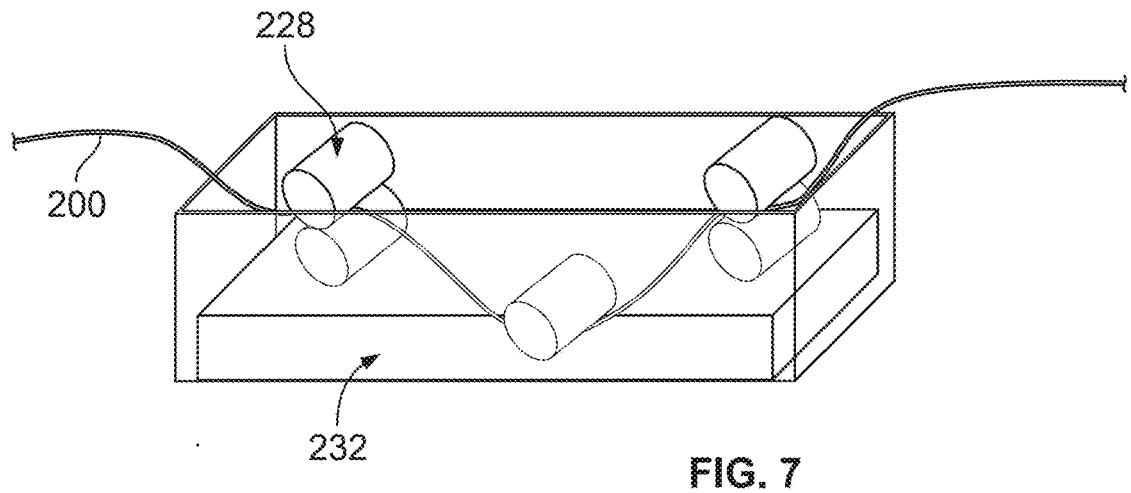
FIG. 7 is a schematic representation of a system for coating a yarn with a coating agent.

Referring to FIG. 7, the yarn 200 may be pulled by a plurality of rollers 228 through a coating agent or a coating ink 232. In some embodiments, the yarn 200 is pulled at a constant rate by the rollers 228 and is fully submerged into the coating agent 232. Upon emerging from the coating agent 232, the coated yarn 200 may be cooled by air or a water bath. Alternatively, the coating agent 232 may be printed, sprayed, showered, or otherwise applied to the yarn 200. The yarn 200 may undergo multiple rounds of application of the coating agent 232, or multiple coating agents 232 of different types. In some embodiments, the coating agent 232 can be a polymeric coating to provide electrical insulation to the core electrode 224. In some embodiments, the coating agent 232 comprises a conductive material, such as Indium Tin Oxide (ITO) or a transparent polyaniline that is applied to the yarn 200. In some embodiments, the coating agent 232 comprises a flexible thin-film transistor that includes nano-wires, which may be tantalum (Ta)-doped tin (IV) oxide ($SnO_2$) nano-wires. In some embodiments, the coating agent 232 comprises the visual display technology, such as, e.g., electrophoretic ink.

Figure 8:
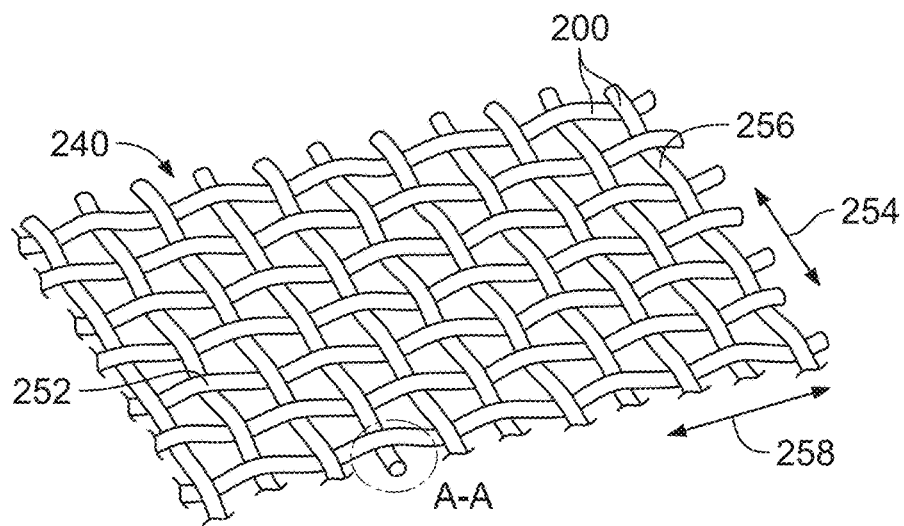
FIG. 8 is a schematic representation of a perspective view of a top side of a woven textile.
Figure 9:
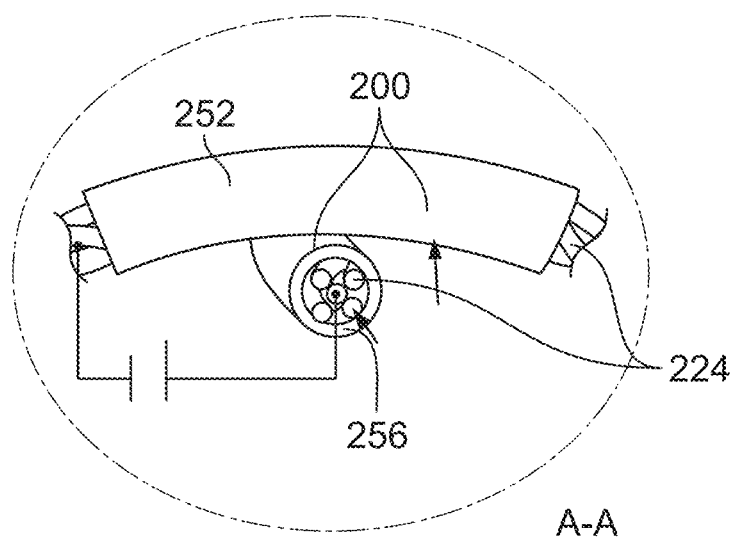
FIG. 9 is a schematic representation of an enlarged, partial, sectional view of portion A-A of the woven textile of FIG. 8.
Figure 10:
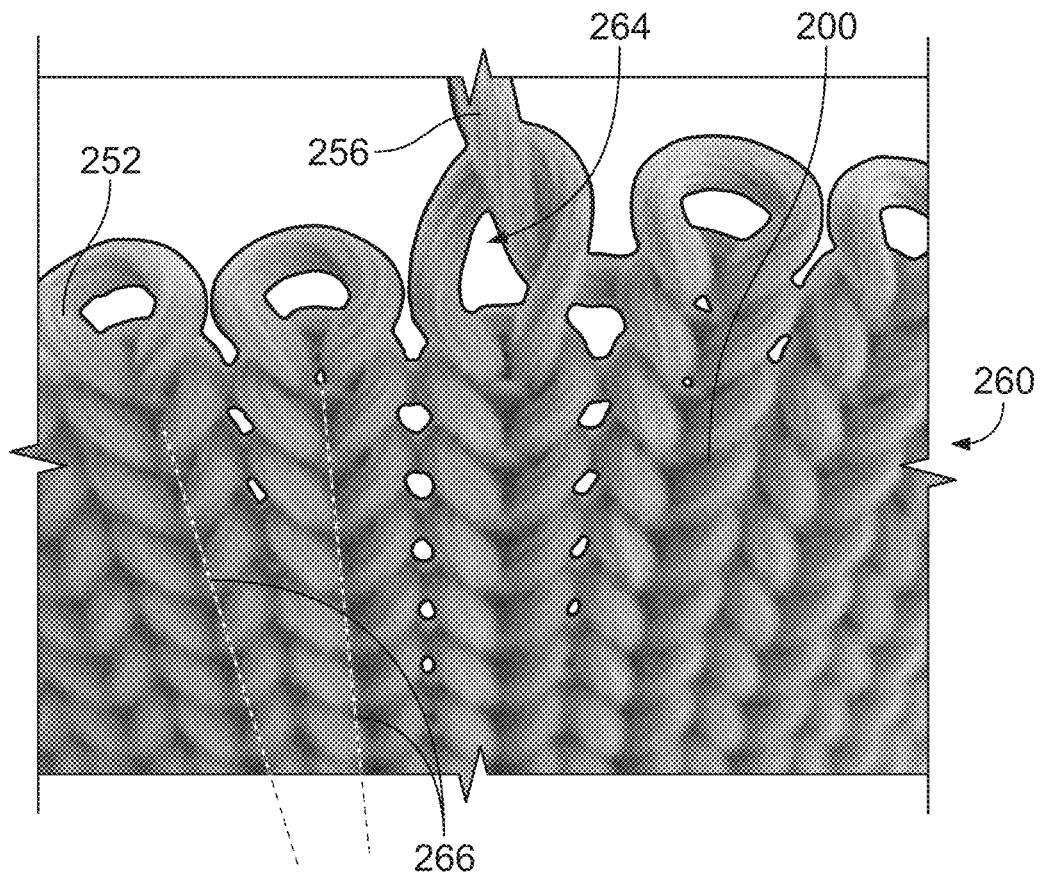
FIG. 10 is a schematic representation of a perspective view of a knitted textile.

Referring to FIGS. 8-10, the yarn 200 may be used to form various textiles and fabrics for use with the article of footwear 100. In some embodiments, the yarn 200 may be woven to form a woven textile 240. Specifically referring to FIG. 8, the yarn 200 may be provided as a first yarn 252 arranged along a weft direction 254 and a second yarn 256 arranged along a warp direction 258, the first yarn 252 and the second yarn 256 being interwoven to create the woven textile 240. The warp direction 258 and the weft direction 254 are generally transverse to one another. In the woven textile 240, the first yarn 252 and the second yarn 256 are arranged linearly along either the warp direction 258 or the weft direction 254. In some embodiments, the first yarn 252 comprises the core electrode 224 and the second yarn 256 does not include the core electrode 224. In some embodiments, both the first yarn 252 and the second yarn 256 comprise the core electrode 224. In some embodiments, the woven textile 240 may only include the core electrode 224 in the yarn 200 extending along the warp direction 258. In some embodiments, the woven textile 240 may only include the core electrode in the yarn 200 extending along the weft direction 254. In some embodiments, the woven textile 240 comprises the core electrode 224 extending along both the warp direction 258 and the weft direction 254. In some embodiments, greater numbers of yarn 200 may be used to form the woven textile 240, such as three, four, five, six, seven, eight, nine, ten, or eleven, or twenty, or thirty, or fifty, or seventy, or one hundred, or two hundred, or one thousand, or two thousand, or five thousand, or more. It will be appreciated that the woven textile 240 may be pulled through the coating agent 232 by the rollers 228, as illustrated in FIG. 7.

Referring to FIG. 10, the yarn 200 may be used to form a knitted textile 260. The knitted textile 260 can be formed by intermeshing the yarns 200 to form a plurality of symmetrical loops 264. The knitted textile 260 follows a meandering path forming the symmetrical loops 264 adjacent a mean path 266, i.e., an axis along which the symmetrical loops 264 are formed, of the knitted textile 260. Due to the arrangement of the yarn 200 in symmetrical loops 264, the knitted textile 260 provides e.g., electrical conductivity, breathability, texture, durability, abrasion resistance, and/or water resistance. It is contemplated that the knitted textile 260 may include the first yarn 252 and the second yarn 256, as described previously. It is further contemplated that the knitted textile 260 may be formed using only one, elongated yarn 200. Still further, it is contemplated that the knitted textile 260 is formed of greater numbers of yarn 200. It will be appreciated that the knitted textile 260 may be pulled through the coating agent 232 by the rollers 228, as illustrated in FIG. 7.

With reference to the material(s) that comprise the upper 102, the specific properties that a particular type of yarn 200 will impart to an area may at least partially depend upon the materials that are used to form the yarn 200. For example, cotton may provide a soft or plush comfort, biodegradable or ecological benefits, and/or a natural aesthetic to a knitted material. Elastane and stretch polyester may each provide a desired elasticity and flexibility. Rayon may provide a high luster and moisture absorbent material. Wool may provide a material with an increased moisture absorbance. Nylon may be a durable material that is abrasion-resistant. Polyester may provide a durable, water resistant, i.e., hydrophobic, material.

In some embodiments, multiple materials may be used to form the upper 102. In some embodiments, the upper 102 may include the knitted textile 260, the woven textile 240, or some combination thereof. In some embodiments, the display portion 190 of the upper 102 may comprise the knitted textile 260 or the woven textile 240, or some combination thereof, and may include the yarn 200 with the core electrode 224 and the coating agent 232. In some embodiments, the upper 102 may also include additional structural elements. For example, in some embodiments, a heel plate or cover (not shown) may be provided on the heel region 112 to provide added support to a heel of a user. In some instances, other elements, e.g., plastic material, logos, trademarks, etc., may also be applied and fixed to an exterior surface using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, or scuff-resistance, may be varied.

Figure 11:
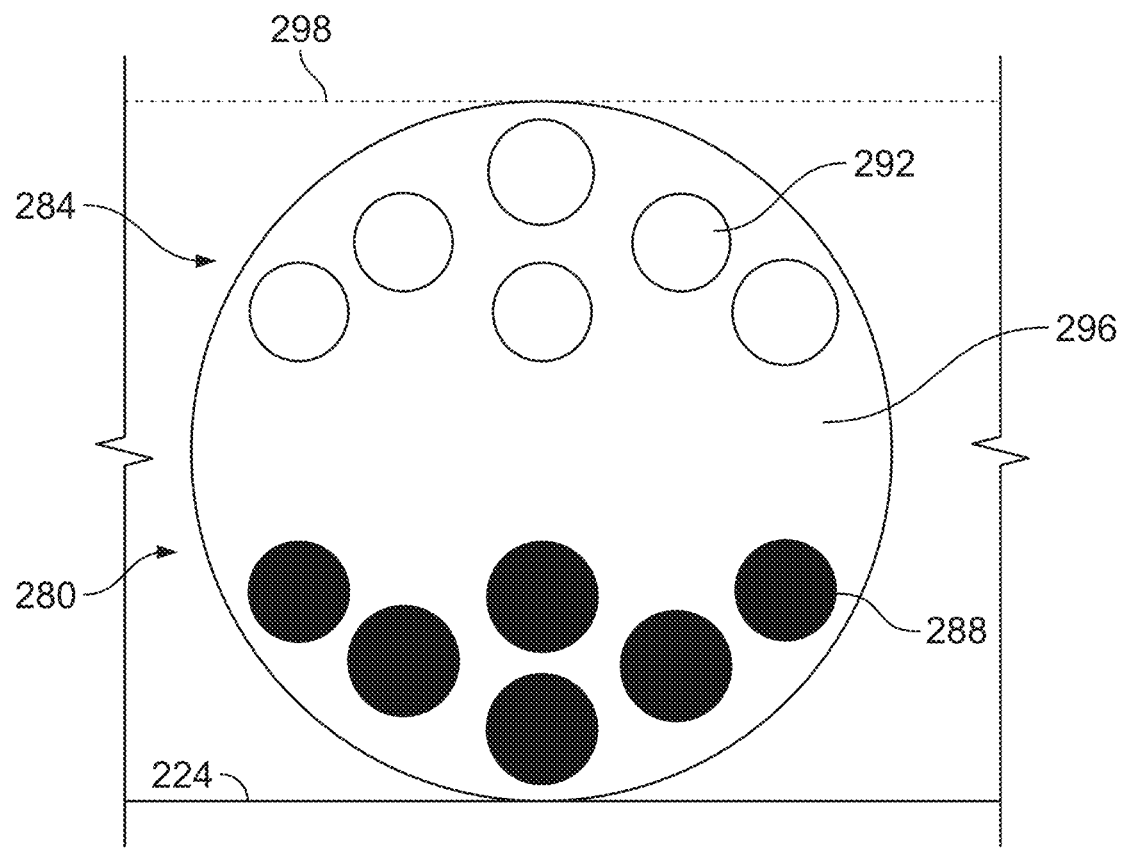
FIG. 11 is a schematic representation of a microcapsule of an electrophoretic ink.

The coating agent 232 (see FIG. 7) may comprise visual display technology, such as electrophoretic ink, to provide the yarn 200 with optoelectronic properties. Referring to FIG. 11, the yarn 200 includes an optoelectronic layer 280 for use in the display portion 190 of the article of footwear 100. To that end, the optoelectronic layer 280 of the yarn 200 may comprise electrophoretic ink that is made of millions of microcapsules 284 each about the diameter of a human hair. In some embodiments, the microcapsules 284 each include two pigments or colors, such as positively charged black particles 288 and negatively charged white particles 292 which are disposed within a transparent fluid 296, as disclosed in the aforementioned U.S. Patents incorporated by reference herein.

Figure 12:
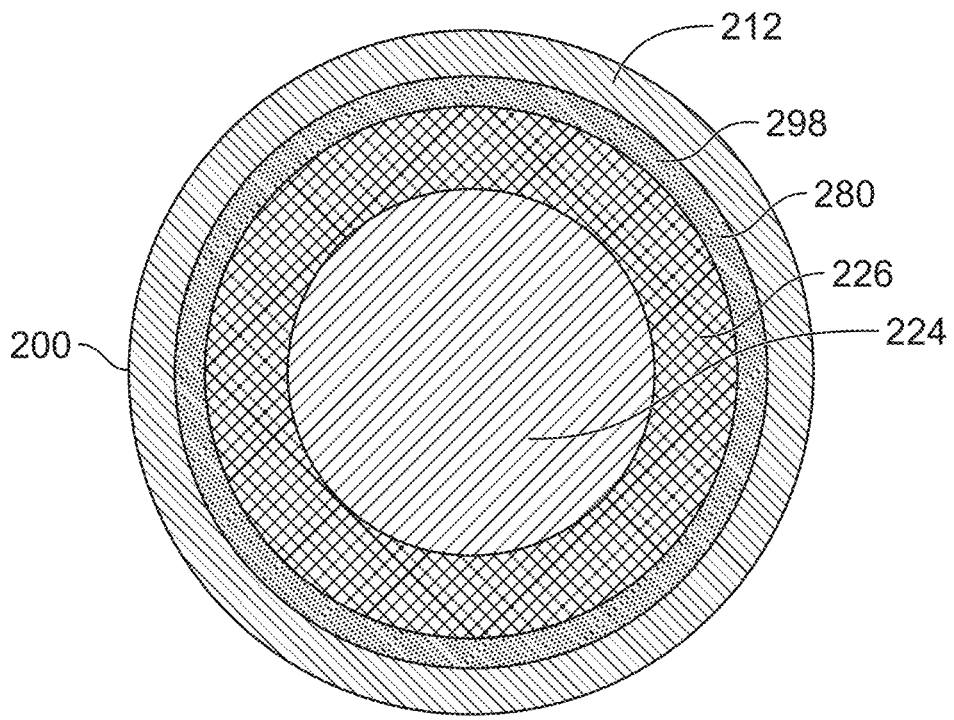
FIG. 12 is a schematic representation of a sectional view of a yarn with a core electrode and an optoelectronic layer.

In some embodiments, the yarn 200 undergoes the coating process, shown in FIG. 7, to include the electrophoretic ink in the optoelectronic layer 280 adjacent or proximate the core electrode 224, as shown in FIG. 12. The electric field generated by the core electrode 224 may be used to operate the optoelectronic layer 280. Accordingly, the yarn 200 including the optoelectronic layer 280 is an optoelectronic fiber. Further, additional coating agents 232 (see FIG. 7) are applied to the yarn 200 to enclose the optoelectronic layer 280 within an outer conductive layer or outer electrode 298. The core electrode 224 and the outer electrode 298 sandwich the microcapsules 284, enabling the manipulation of particles by conducting electricity to form an electric field for operation of the optoelectronic layer 280 and, thus, the display portion 190 of the article of footwear 100. It will be appreciated that, when the optoelectronic layer 280 includes the electrophoretic ink, a positive or negative electric field is applied to the microcapsule 284, where the negatively charged white particles 292 and the positively charged black particles 288, or portions thereof, move across the microcapsule 284 to either be visible to the viewer or hidden/covered. For example, the positively charged black particles 288 move toward a negative electric field and are repelled by a positive electric field. Conversely, the negatively charged white particles 292 move toward a positive electric field and are repelled by a negative electric field. By alternating the positive and negative charges of the microcapsule 284 along the surface, a text or a graphics may be formed.

The microcapsule 284 with bicolor pigments or multi-color pigments may be applied to the yarn 200 by, e.g., coating, printing, spraying, adhering, or other suitable methods. In some embodiments, the electrophoretic ink may comprise microcapsules having more than two pigments, such as three pigments, or four pigments, or more, to provide an optoelectronic layer 280 that is capable of displaying various colors. Referring to FIG. 12, a schematic of a cross-sectional view of the yarn 200 illustrates the core electrode 224 circumscribed and enclosed by the fiber strands 226, the fiber strands 226 circumscribed and enclosed by the optoelectronic layer 280, the optoelectronic layer 280 circumscribed and enclosed by the outer electrode 298, and the outer electrode 298 circumscribed and enclosed by the outer layer 212. In some embodiments, the yarn 200 comprises more than one optoelectronic layer 280, or the optoelectronic layer 280 may be circumscribed and enclosed by the fabric strands 226. In some embodiments, the fabric strands 226 are positioned to enclose the outer layer 212, or the fabric strands 226 are disposed between the optoelectronic layer 280 and the outer electrode 298. In some embodiments, the optoelectronic layer 280 may be arranged as the outermost layer, without the outer electrode 298, such that the optoelectronic layer 280 is exposed for use with a separably and removable conductive tool (not shown), such as, e.g., a stylus or pen, that can be pressed against the optoelectronic layer 280 to initiate color changes. In some embodiments, the outer layer 212 is a finish or varnish, such as a polyamide varnish, for durability, flexibility, improving optical clarify or performance, thermal resistance, wear resistance, or aesthetic purposes.

In some embodiments, the display portion 190 (see FIG. 1) may include the yarn 200 having the optoelectronic layer 280 formed into woven textile 240 or the knitted textile 260. Accordingly, the woven textile 240 and/or the knitted textile 260 may be an optoelectronic fiber panel comprising yarn 200 having the optoelectronic layer 280. In some embodiments, referring back to FIGS. 8-10, the first yarn 252 may comprise the optoelectronic layer 280 and the second yarn 256 may not comprise the optoelectronic layer 280 to form the woven textile 240 or the knitted textile 260. In some embodiments, referring back to FIG. 10, the knitted textile 260 may be entirely knitted using yarn 200 having the optoelectronic layer 280. In some embodiments, portions of the woven textile 240 or the knitted textile 260 may include the optoelectronic layer 280 within the first yarn 252 or the second yarn 256, or along portions thereof, to arrange the display portion 190 at desired locations on the article of footwear 100. In addition, the woven textile 240 and/or the knitted textile 260 may comprise folding sections (not shown) without the optoelectronic layer 280 where the upper 102 can fold or collapse as the user walks, runs, or otherwise uses the article of footwear 100. The folding sections of the textile 240, 260 may be disposed between or surround display portion 190 that comprise the optoelectronic layer 280. In some embodiments, the folding sections are positioned within the forefoot region 108 along the lateral side 116 or the medial side 118, or both. In some embodiments, the folding sections of the textiles 240, 260 may still comprise the core electrode 224 to transmit electricity to the display portions 190.

Figure 13:
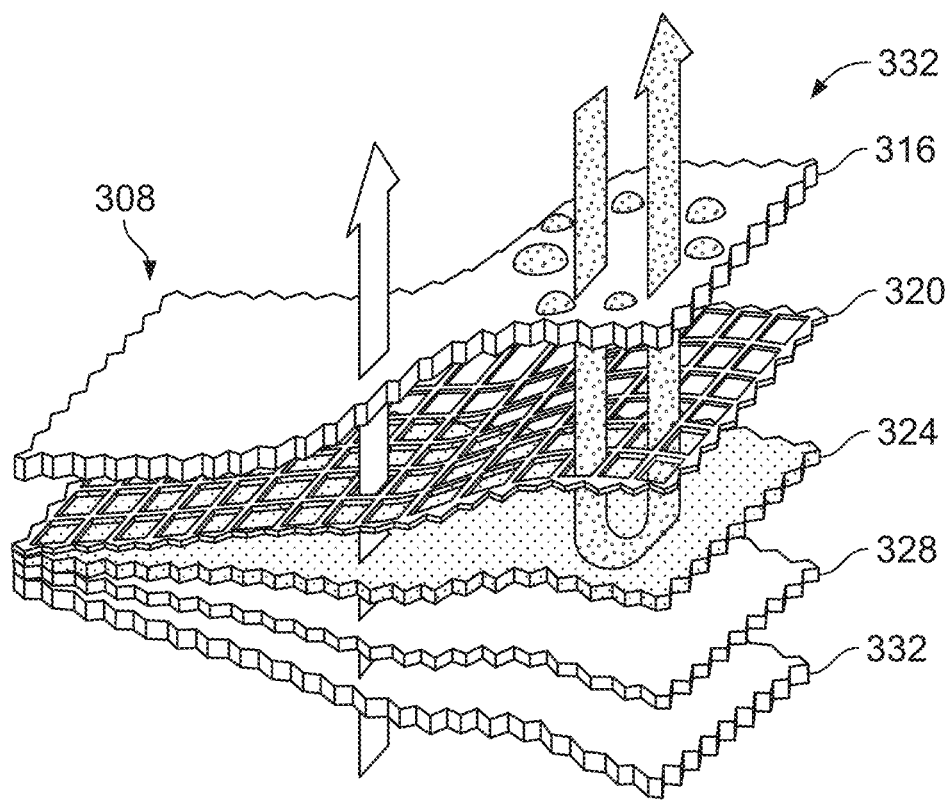
FIG. 13 is a schematic representation of a perspective view of a substrate.

Referring to FIG. 13, the upper 102 (see FIG. 1) may comprise a non-conductive layer or substrate 308. In the illustrated embodiment, the substrate 308 may include an exterior layer 316, a first protective layer 320, a second protective layer 324, an insulation membrane 328, and an interior layer 332. Each of the layers 316, 320, 324, 328, 332 may provide the substrate 308 with certain properties, such as, e.g., particular density, water resistance or transmittance, breathability or air flow, cushioning, electrical insulation, flexibility or rigidity, aesthetics, or thermal regulation, among other properties. It is preferable that the substrate 308 prevent electricity from being conducted to a human foot. To that end, at least one of the layers 316, 320, 324, 328, 332 is configured to provide electrical insulation properties to separate the yarn 200 having the core electrode 224 from the human foot within the article of footwear 100. The substrate 308 may be a non-conductive textile layer, similar to the woven textile 240 (see FIG. 8) or the knitted textile 260 (see FIG. 10).

Figure 14:
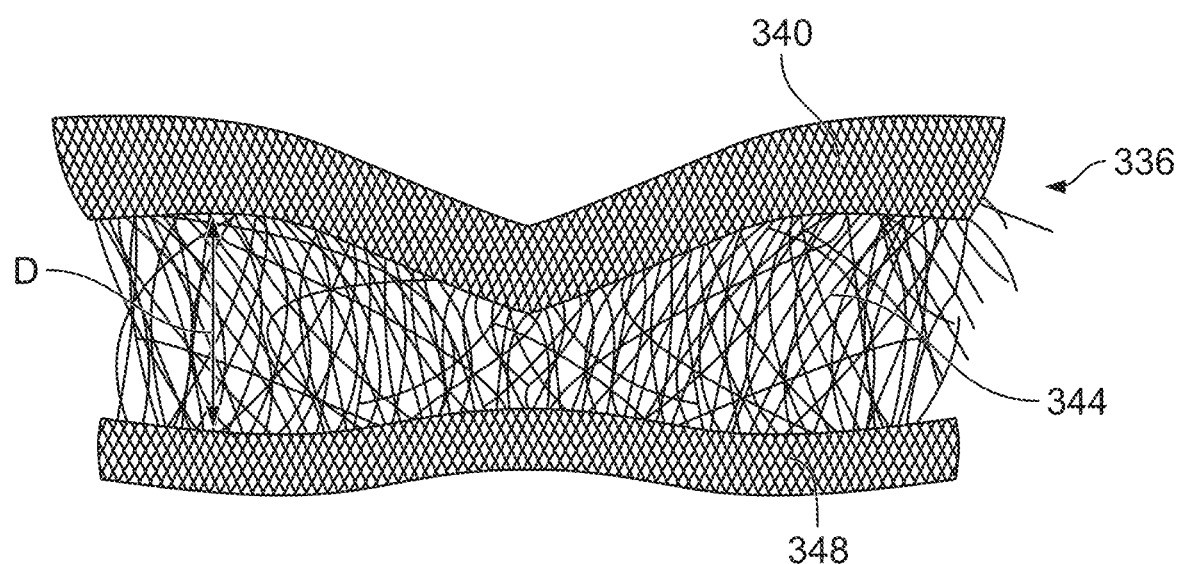
FIG. 14 is a schematic representation of a side view of a spacer knit structure.

Referring to FIG. 14, the upper 102 (see FIG. 1) may include a spacer knit textile 336 having an outer layer 340, a spacer or intermediate layer 344, and an inner layer 348. In the illustrated embodiment, the outer layer 340 may comprise the woven textile 240 (see FIG. 8) or the knitted textile 260 (see FIG. 10). In some embodiments, the outer layer 340 includes the display portion 190 (see FIG. 1), such that the yarn 200 (see FIG. 12) having the optoelectronic layer 280, core electrode 224, and outer electrode 298 are present within the outer layer 340. The spacer layer 344 may attach the outer layer 340 to the inner layer 348. The spacer layer 344 may be formed of loosely knitted or woven fabric strands 226, which may allow for improved breathability and air flow, insulation, cushioning, and flexibility, among other properties. Further, the spacer layer 344 may be configured to arrange the outer layer 340 and the inner layer 348 at a distance D that is sufficient to prevent any electrical field created by or applied to the display portion 190 from interacting with the human foot in the article of footwear 100. In some embodiments, the substrate 308 of FIG. 13 may be included within the inner layer 348 or the spacer layer 344.

Figure 15:
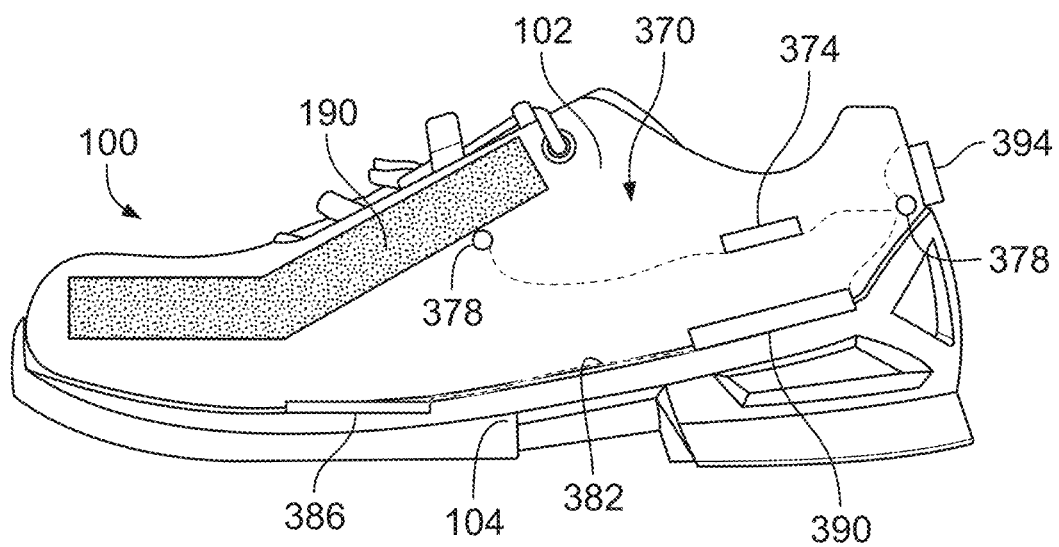
FIG. 15 is a schematic representation of a perspective view of a medial side of the article of footwear showing an electrical circuit and a display portion, according to an embodiment of the disclosure.

Turning to FIG. 15, the article of footwear 100 includes the upper 102 attached to the sole structure 104, the display portion 190, and an electrical circuit 370 provided within the sole structure 104 and the upper 102. The electrical circuit 370 comprises a control module 374, an electrical contact 378, conductive leads or wires 382, a piezoelectric transducer 386, a capacitor or storage cell 390, and an input device 394. The storage cell 390 and the piezoelectric transducer 386 may comprise the power source of the electrical circuit 370. In some embodiments, the storage cell 390 is a battery, such as a printed battery, a rechargeable battery, a disposable battery, or the like. The storage cell 390 may be a Nickel-Cadmium (NiCd), Nickel-Metal Hydride (NiMH), Lithium Ion (Li-ion), lead acid, or the like. In some embodiments, the electrical circuit 370 may include fewer components than shown. For example, the electrical circuit 370 may not include the piezoelectric transducer 386. In some embodiments, the electrical circuit 370 may include additional components, such as, e.g., multiple piezoelectric transducers 386, or multiple storage cells 390, or multiple input devices 394, or multiple control modules 374, or switches (not shown), or ports (not shown), or relays (not shown), or the like. In some embodiments, the electrical circuit 370 may be disposed entirely within the sole structure 104. In some embodiments, the electrical circuit 370 may be disposed entirely within the upper 102.

Figure 16:
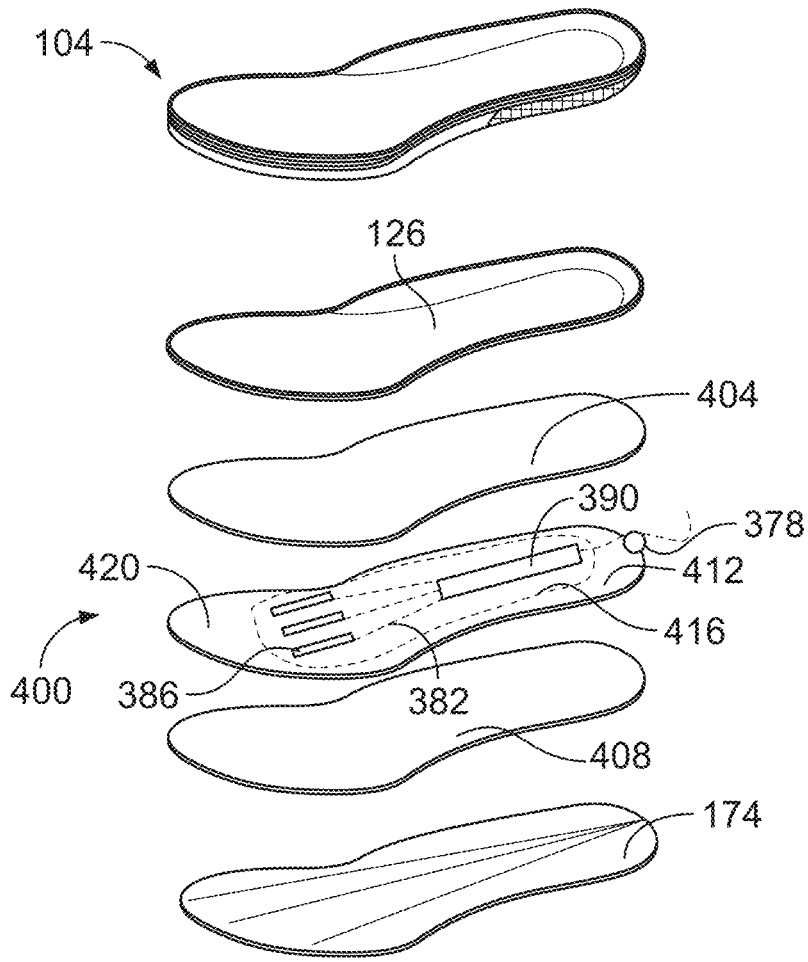
FIG. 16 is a schematic representation of a perspective view of a multilayer midsole.

Turning to FIG. 16, the sole structure 104 (see FIGS. 1 and 15) may include a multicomponent midsole 400 structure. The multicomponent midsole 400 is, preferably, located between the insole 126 and the outsole 174 of the article of footwear 100. The multicomponent midsole 400 includes an upper segment 404, a lower segment 408, and a plate 412 sandwiched between the upper segment 404 and the lower segment 408. The plate 412 is configured to provide lever-like assistance and stabilization with minimal addition to the weight of the sole structure 104, such that the plate 412 is capable of harnessing kinetic energy to leverage momentum through a user's foot strike or gait cycle, thereby reducing fatigue experienced by the user during a variety of activities, including walking, running, and jumping. To that end, the plate 412 may comprise various natural or synthetic materials that exhibit high strength-to-weight ratios, such as, e.g., bamboo, carbon fiber, or aramid fiber, among other materials. In some embodiments, the electrical circuit 370 is printed or embedded within the plate 412, such as, e.g., through additive manufacturing methods. In some embodiments, the electrical circuit 370 is coupled or attached to the plate 412 after the plate 412 is manufactured. Accordingly, the plate 412 may include a circuit board 416 that comprises at least some components of the electrical circuit 370. The circuit board 416 of the plate 412 may be a printed circuit board (PCB) or a flexible circuit board. In some embodiments, the plate 412 may include a field-effect transistor 420, such as a rigid thin-film transistor or a flexible thin-film transistor, in the form of a substrate. In some embodiments, the plate 412 may be manufactured via an additive manufacturing process and may be fabricated from, e.g., nylon, fiberglass, carbon fiber, and/or aramid fiber, among other materials. Various methods of additive manufacturing and additive manufacturing systems can be used to manufacture the plate 412 according to the present disclosure, such as, e.g. fused deposition modeling, continuous fiber reinforcement, fused filament fabrication, selective laser sintering, electron beam melting, laser powered bed fusion, ultrasonic additive manufacturing, material extrusion, material jetting, electrochemical deposition, cold spray metal printing, DLP metal printing, or another additive manufacturing method.

In some embodiments, the piezoelectric transducers 386 may be formed as part of a microelectromechanical system (MEMS) for energy harvesting. The piezoelectric transducers 386 may be MEMS transducers, such as a dielectric elastomer generators (DEGs). The piezoelectric transducers 386 may be provided as a thin film with piezoelectric material, e.g., lead zirconate titanate (PZT), lead lanthanum zirconate titanate (PLZT), barium titanate, ammonium dihydrogen phosphate (ADP), among other materials, and thin metal film, e.g., silver. Those materials could be deposited from a vapor phase using sputtering or evaporation, or in a liquid form of suspension particles (nano-ink) or in a semi-solid gel form by spinning, dip-coating, slot-die coating, xerography, gravure, screen printing, inkjet printing, microcontact printing, aerosol deposition, or other methods. The piezoelectric transducers 368 may include the piezoelectric material sandwiched between two electrodes made of conductive material, such as, e.g., a metal or metal alloy, including silver, copper, gold, aluminum, zinc, or a transparent conductive material, such as, e.g., indium-tin-oxide (ITO) or another transparent conductive oxide, or graphene, or silver nanowires. Accordingly, the robust and withstand dynamic pressure, extreme temperatures, and harsh operational conditions. Additionally, the thin film transducers provide various benefits such as, e.g., lightweight, durability, and flexibility.

The piezoelectric transducers 386 are used as energy harvesters to convert kinetic energy into electrical energy via electrostatic pressure for powering or controlling the optoelectronic display 190. Accordingly, the piezoelectric transducers 386 convert an input energy to a different form of output energy. For example, a mechanical kinetic energy may be converted into electrical energy. In some embodiments, the piezoelectric transducers 386 may be located within the midsole 172 of the sole structure 104 (see FIG. 15). In some embodiments, the piezoelectric transducers 386 are disposed within the plate 412 (see FIG. 16) of the sole structure 104. The plate 412 can be manufactured separately from the sole structure 104 and, thus, the piezoelectric transducers 386 may be provided on the plate 412 prior to assembly with the sole structure 104. The plate 412 is generally composed of a stiffer material than the material of the surrounding or adjacent parts of the sole structure 104, but the plate 412 is still pliable enough to deform during use and, thus, the piezoelectric transducers 386 may be advantageously provided on the plate 412 for converting kinetic energy to electrical energy. In some embodiments, the piezoelectric transducers 386 may be located near the heel region 112. During a full stride, the heel region 112 may experience increased amounts of pressure, making the heel region 112 an ideal location for the piezoelectric transducers 386 to be located. In some embodiments, the piezoelectric transducers 386 may be located in the forefoot region 108 where pressure is exerted during toe-off, or the piezoelectric transducers 386 may be located within the midfoot region 110 where pressure is exerted during bodyweight loading stages of the stance phase, i.e., when at least 50% of the user's bodyweight is exerted onto one foot, in the user's gait cycle.

Figure 17:
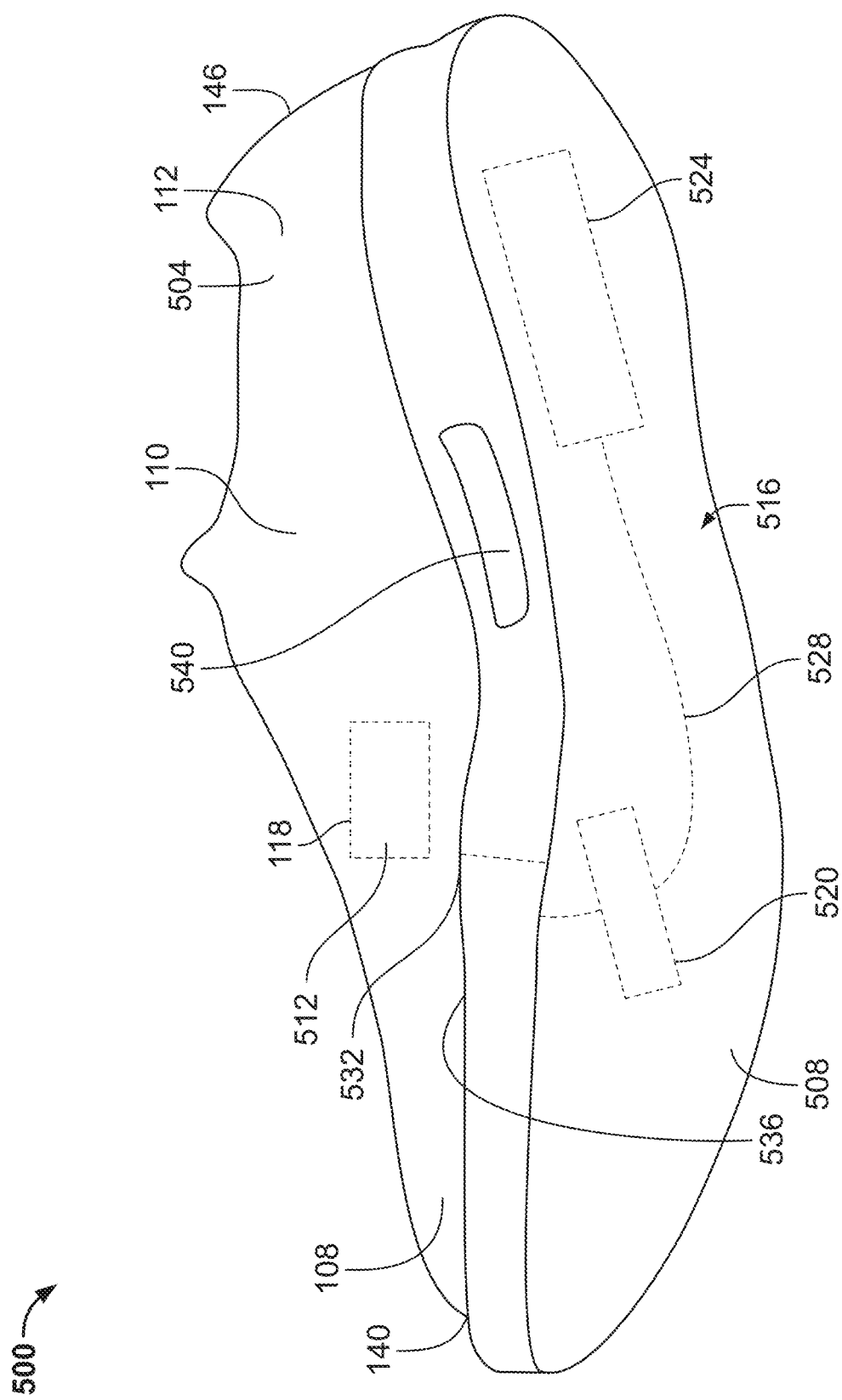
FIG. 17 is a schematic representation of a perspective view of a medial side of an article of footwear configured as a right shoe, with the upper having a display portion, according to an embodiment of the disclosure.

Referring to FIG. 17, another embodiment of an article of footwear 500 includes an upper 504 attached to a sole structure 508, an optoelectronic display 512, and an electrical circuit 516. The optoelectronic display 512 includes the yarn 200 comprising the optoelectronic layer 280 and the core electrode 224 (see FIG. 12). In the illustrated embodiment, elements that are shared with—i.e., that are structurally and/or functionally identical to—elements present in the first embodiment of the footwear 100 are represented by equivalent reference numerals. The electrical circuit 516 comprises a control unit 520 and a power source 524 that are configured to communicate with the optoelectronic display 512 via a wire or conductive leads 528. In some embodiments, the circuit 516 is disposed or retained within the sole structure 508. For example, the power source 524 may be embedded within or disposed between layers of the sole structure 508. In some embodiments, the control unit 520 is embedded within or disposed between layers of the sole structure 508. In some embodiments, the conductive leads 528 may extend along the sole structure 508, between and through the layers of the sole structure 508, and into contact with or along the upper 504. Further, the optoelectronic display 512 may include an electrical contact 532 disposed along a periphery 536 of the upper 504, e.g., an edge or boundary where the upper 504 and the sole structure 508 are joined together. In some embodiments, the periphery 536 functions as the electrical contact 532. In some embodiments, a portion or discrete segments of the periphery function as the electrical contact 532. In some embodiments, the electrical contact 532 is attached between the upper 504 and the sole structure 508, separately and spaced apart from the periphery 536.

As illustrated in FIG. 17, the optoelectronic display 512 may be disposed along the upper 504 from the toe end 140 to the heel end 146 and across the medial side 118 to the lateral side (see FIG. 2). In some embodiments, the optoelectronic display 512 is disposed within the forefoot region 108, the midfoot region 110, and the heel region 112 and along one of the medial side 118 or the lateral side 116. In some embodiments, the optoelectronic display 512 is disposed within one of the forefoot region 108, the midfoot region 110, or the heel region 112. In some embodiments, the optoelectronic display 512 is disposed within two of the forefoot region 108, the midfoot region 110, or the heel region 112. For example, the optoelectronic display 512 may extend continuously from the forefoot region 108 to the midfoot region 110.

The power source 524 may be a storage cell, such as, e.g., a battery or a capacitor. The power source 524 may be rechargeable via a mechanical connection port (not shown) that is accessible externally on the sole structure 508, such as, e.g., a USB or USB-C, Apple Lightning®, or any other suitable interface. In some embodiments, the power source 524 may be rechargeable wirelessly, without the use of any port, by proximity to a wireless charging pad or mat. The power source 524 may be a Nickel-Cadmium (NiCd), Nickel-Metal Hydride (NiMH), Lithium Ion (Li-ion), lead acid, or the like. In some embodiments, the power source 524 includes a plurality of storage cells and/or piezoelectric devices. In some embodiments, the power source 524 is removably attached to the sole structure 508 of the footwear 500, such that the power source 524 may be removed, e.g., through an opening in the sole structure 508 or the upper 504. In further embodiments, the power source 524 may be housed on top of the tongue 170 (see FIG. 2) of the upper 102 or anywhere around the upper 102.

The control unit 520 is provided to control the optoelectronic display 512. For example, the control unit 520 may be configured to send signals in the form of current changes and/or voltage changes to the optoelectronic display 512. In some embodiments, the control unit 520 is a switch or a switch matrix that can selectively intervene between the power source 524 and the optoelectronic display 512. In some embodiments, the control unit 520 is configured for binary operation, such that the optoelectronic display 512 may either receive power or may not receive power from the power source 524. In some embodiments, the control unit 520 is capable of modulation, such that the optoelectronic display 512 may receive a full amount of power, a minimum amount of power, and one or more intermediate levels of power therebetween from the power source 524. In some embodiments, the control unit 520 is configured for selective control of portions of the optoelectronic display 512, such that portions of the optoelectronic display 512 may receive power while other portions of the optoelectronic display 512 may not receive power. To that end, the control unit 520 may be a central processing unit (CPU), or a printed circuit board (PCB) or a flexible circuit board, or the like. In some embodiments, a plurality of control units 520 is provided for selective control of the optoelectronic display 512 or portions of the optoelectronic display 512.

The control unit 520 may receive inputs from the input device 540. The input device 540 may be any suitable type of sensor or actuator for communicating with the control unit 520 to selectively control the optoelectronic display 512. In some embodiments, the input device 540 is a touch-activated sensor along which a user's finger can slide or tap to control the optoelectronic display 512. Touch-activated sensors of various types are contemplated, including a capacitive touch slide sensor, a capacitive touch tap sensor, a resistive touch slide sensor, or a resistive touch tap sensor. In some embodiments, the input device 540 may be a vibration sensor that is configured to detect vibration frequencies caused by kinetic motion of the footwear 500 or applied to the footwear 500. Vibration sensors of various types are contemplated, including strain gauges, accelerometers, gyroscopes, or the like. In some embodiments, the input device 540 is a microphone, such that sound waves of various frequencies may be detected for control of the optoelectronic display 512 via the control unit 520. For example, the input device 540 may be capable of voice-activation by which the user can dictate "on" or "off" for controlling the optoelectronic display 512. In some embodiments, the input device 540 is not provided on the footwear 500 and, instead, the input device 540 is a user's smartphone, tablet, laptop, smartwatch or wearable electronic, special-purpose computer or device, or the like. For example, the user may access a mobile application via a smartphone for communication over a wireless communication network with the control unit 520. In such embodiments, the control unit 520 includes a wireless transceiver operating over a Wi-Fi connection, a Bluetooth® connection, an RFID or NFC connection, or the like. The user may control the optoelectronic display 512 on the footwear 500 wirelessly via the mobile application on the smartphone.

In some embodiments, a thin-film transistor is provided on or as part of a substrate and alternates the "on" or "off" switch of the optoelectronic display 512. The optoelectronic display 512 may be formed by microcapsules 284 forming a pixelated matrix along the surface of the optoelectronic display 512, which may be switched "on" or "off" by the thin-film transistor. The thin-film transistor may be manipulated by an electric field to control the flow of the current within a semiconductor. The thin-film transistors may be formed from thin films of amorphous silicon deposited on a substrate. The thin-film transistors serve as a control switch to provide an electric field to the pixelated matrix of the optoelectronic display 512.

In some embodiments, the conductive leads 528 or wires may provide electrical connection to different electrical components. The conductive leads 528 may be made from conductive materials such as lead, silver, gold, copper, aluminum, zinc, or alloys thereof. In some embodiments, the conductive materials may be formed of carbon-based materials such as carbon nanotubes, carbon grease, and carbon powder.

The optoelectronic display 512 may be provided as part of the upper 504 in various configurations and locations. In some embodiments, the optoelectronic display 512 may be provided as the outer layer 340 (see FIG. 14) applied to a portion of the upper 504 while the non-conductive inner layer 348 is positioned opposite to the outer layer 340. In some embodiments, the optoelectronic display 512 is permanently attached to the upper 504 by, e.g., adhesive, fastening, welding, knitting or weaving, molding, or the like. In some embodiments, the optoelectronic display 512 is removably attached to the upper 504 by, e.g., fasteners, magnetic elements, adhesive, or the like.

Figure 18:
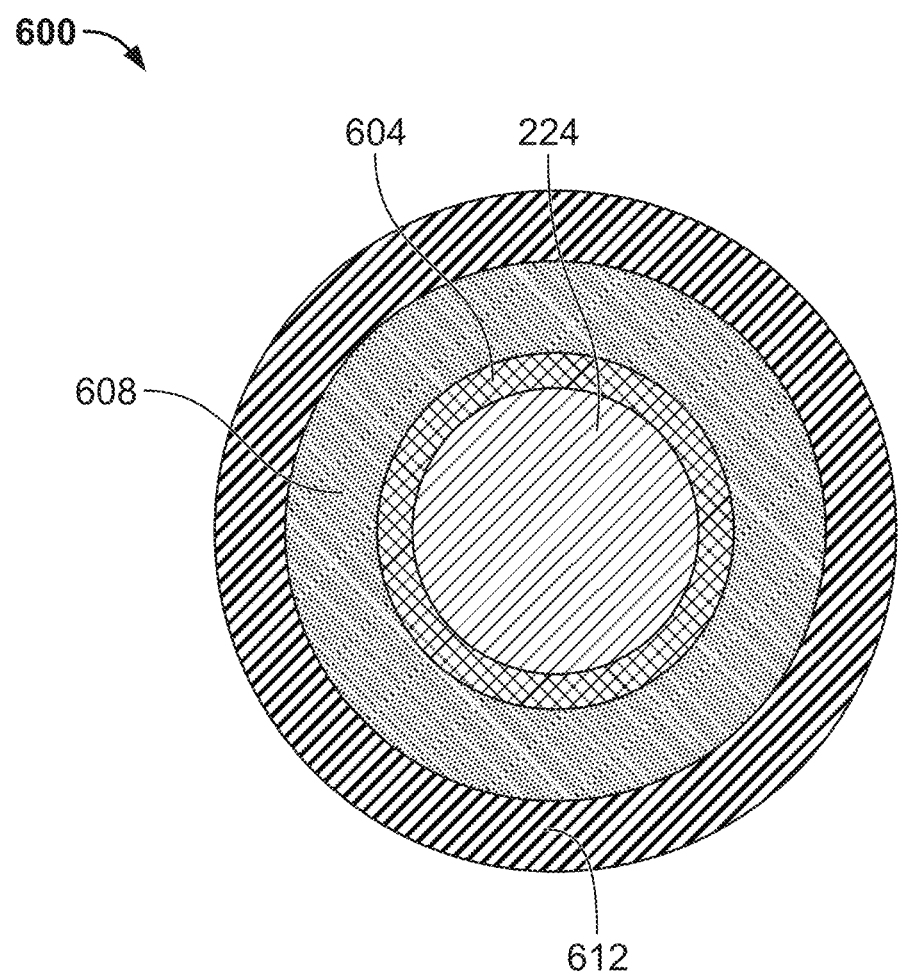
FIG. 18 is a schematic representation of a sectional view of a yarn.

FIG. 18 depicts another embodiment of an optoelectronic yarn or fiber element 600 comprising the conductive core electrode 224 surrounded by a fabric layer 604, an optoelectronic layer 608, and an outer protective layer 612. The optoelectronic layer 608 may incorporate the electrophoretic ink, as described in connection with FIGS. 11 and 12, and in the aforementioned U.S. Patents incorporated by reference. In the illustrated embodiment, the core electrode 224 is enclosed by the fabric layer 604 provided in the form of a layer of synthetic or natural fibers. The fabric layer 604 is surrounded by the optoelectronic layer 608. The core electrode 224 is configured to apply an electric field to the optoelectronic layer 608. The optoelectronic layer 608 is surrounded by the outer protective layer 612. The outer protective layer 612 can include a transparent and flexible thin-film transistor (not shown) to switch the microcapsules embedded within the optoelectronic layer 608 "on" or "off." In some embodiments, a conductive material, such as Indium Tin Oxide (ITO) or a transparent polyaniline is applied to the optoelectronic fiber 600. In some embodiments, a flexible thin-film transistor that includes nano-wires, which may be tantalum (Ta)-doped tin (IV) oxide ($SnO_2$) nano-wires, is applied to the optoelectronic fiber 600.

Figure 19:
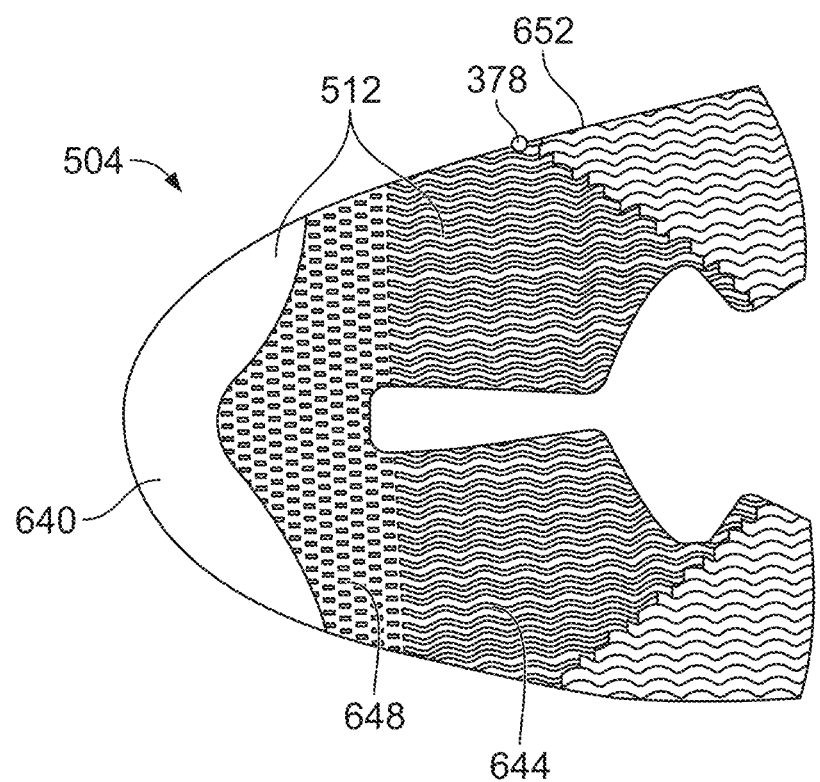
FIG. 19 is a schematic representation of the upper of FIG. 17 including multiple display portions.

FIG. 19 depicts the upper 504 comprising an optoelectronic display 512 including the optoelectronic fiber 600 of FIG. 18. In some embodiments, the optoelectronic display 512 is positioned at different locations of the upper 102. To that end, the upper 504 can include a first optoelectronic display portion 640 and a second optoelectronic display portion 644, which may be interwoven with a mesh portion 648. The mesh portion 648 may optionally include the core electrode 224 for transmission of electricity between the first optoelectronic display portion 640 and the second optoelectronic display portion 644, or to other portions of the article of footwear 500 (see FIG. 17). In some embodiments, the mesh portion 648 includes the yarn 200 and/or the optoelectronic fiber 600. In some embodiments, the mesh portion 648 lacks the visual display technology, such as the optoelectronic layer 280, and is provided instead for moisture regulation, temperature regulation, weight reduction, cost efficiency, and flexibility. The periphery of the upper 504 may include conductive ends or contacts interwoven with the first optoelectronic portion 640, the mesh portion 648, and/or the second optoelectronic portion 644. For example, the second optoelectronic portion 644 is located toward the toe end 140 of the article of footwear 100. The first optoelectronic portion 640 is located toward the medial side 118 of the article of footwear 100. The mesh portion 648 is located between the first optoelectronic portion 640 and the second optoelectronic portion 644. The upper 504 may include electric contacts 378 in the form of conductive ends along the periphery 652, comprising conductive metal such as silver, copper, gold, aluminum, zinc, or the like.

Figure 20:
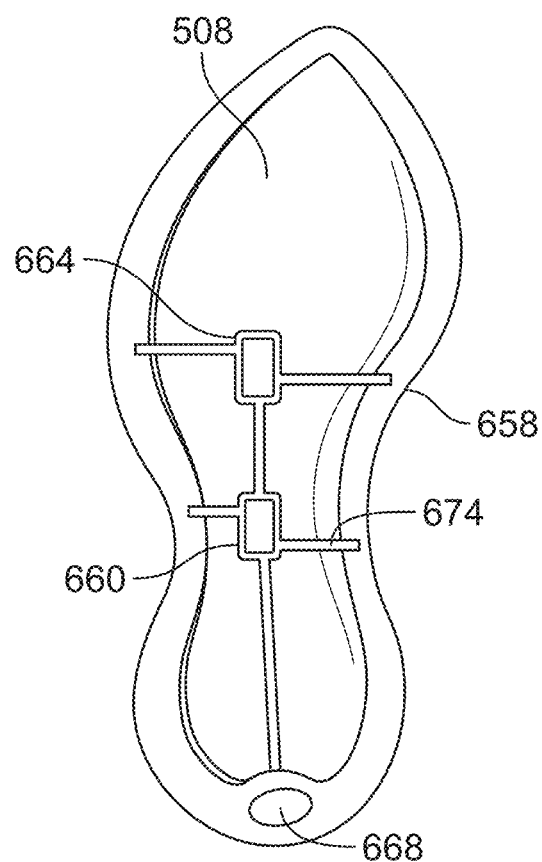
FIG. 20 is a schematic representation of the sole structure of FIG. 17 including an electrical circuit and a flexible thin-film transistor.

FIG. 20 depicts the sole structure 508 including a periphery 658 and a power source 660, a field-effect transistor 664, a control module 668, and a conductive lead 674. The upper 504 of FIG. 19 may be received by the sole structure 508 of FIG. 20. The periphery 652 of the upper 504 (see FIG. 19) comprising the conductive ends may be coupled along the periphery 658 of the sole structure 508. The field-effect transistor 664 may extend along the periphery 658 of the sole structure 508, such that the electrical contact 378 or conductive ends of the upper 504 are connected to the field effect transistor 664. Further, the field effect transistor 664 may be positioned between the optoelectronic display 512 and the power source 660. The power source 660 may be provided within the heel region 112 of the sole structure 508. The control module 668 may be integrally formed with a port (not shown) for recharging the power source 660.

Figure 21:
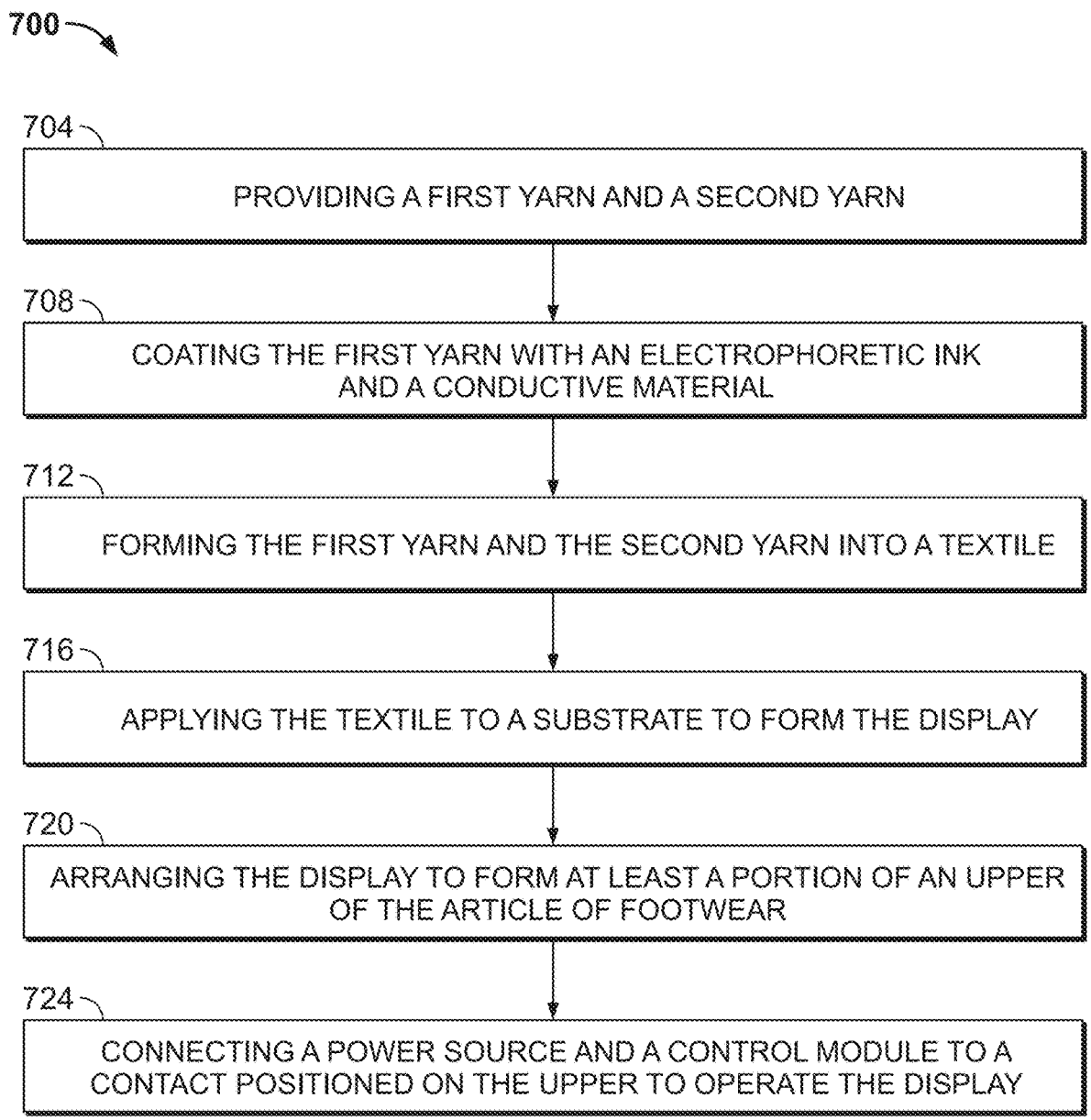
FIG. 21 is an example flowchart illustrating a method of assembling a display portion, according to an embodiment of the present disclosure.

FIG. 21 illustrates an example method 700 of assembling the display portion 190, 512 for the article of footwear 100, 500. Step 704 of the method 700 includes providing the first yarn 252 and the second yarn 256, which may resemble the yarn 200 of FIG. 12 or the fiber 600 of FIG. 18. In some embodiments, the first yarn 252 includes the monofilament core 208. In some embodiments, the first yarn 252 includes the multifilament core 204. The first yarn 252 includes the core electrode 224. Step 708 of the method 700 includes coating the first yarn 252 with electrophoretic ink to form the optoelectronic layer 280 and conductive material to form the outer electrode 298 adjacent the optoelectronic layer 280. The method 700 comprises forming the first yarn 252 and the second yarn 256 into the woven textile 240 or knitted textile 260, as in Step 712. Step 716 of the method 700 includes applying the woven textile 240 or the knitted textile 260, or some combination thereof, to the substrate 308 to form the display portion 190. Preferably, the substrate 308 includes non-conductive material for providing electrical insulation properties. In some embodiment, a thin-film transistor is deposited on or included as part of the substrate 308, and the thin-film transistor aids in controlling and/or applying selective electrical fields across the optoelectronic layer 280. Step 720 includes arranging the display portion 190 to form at least a portion of the upper 102 of the article of footwear 100. Further, Step 724 includes connecting the electrical circuit 370 to the display portion 190. In some embodiments, the control module 374 and the power supply comprising the storage cell 390 and/or the piezoelectric transducer 386 of the electrical circuit 370 are connected to the electrical contact 378 positioned on the upper 102 for operating the display portion 190. In some embodiments, there are multiple electrical contacts 378, such that one of the electrical contacts 378 is connected to the core electrode 224 of the first yarn 252 and another of the electrical contacts 378 is connected to the outer electrode 298. In some embodiments, the first yarn 252 and/or the second yarn 256 includes the flexible field-effect transistor for applying an electrical field to the display portion 190. It will be appreciated that the method 700 may be similarly employed to form the display 512 of the article of footwear 500.

Figure 22:
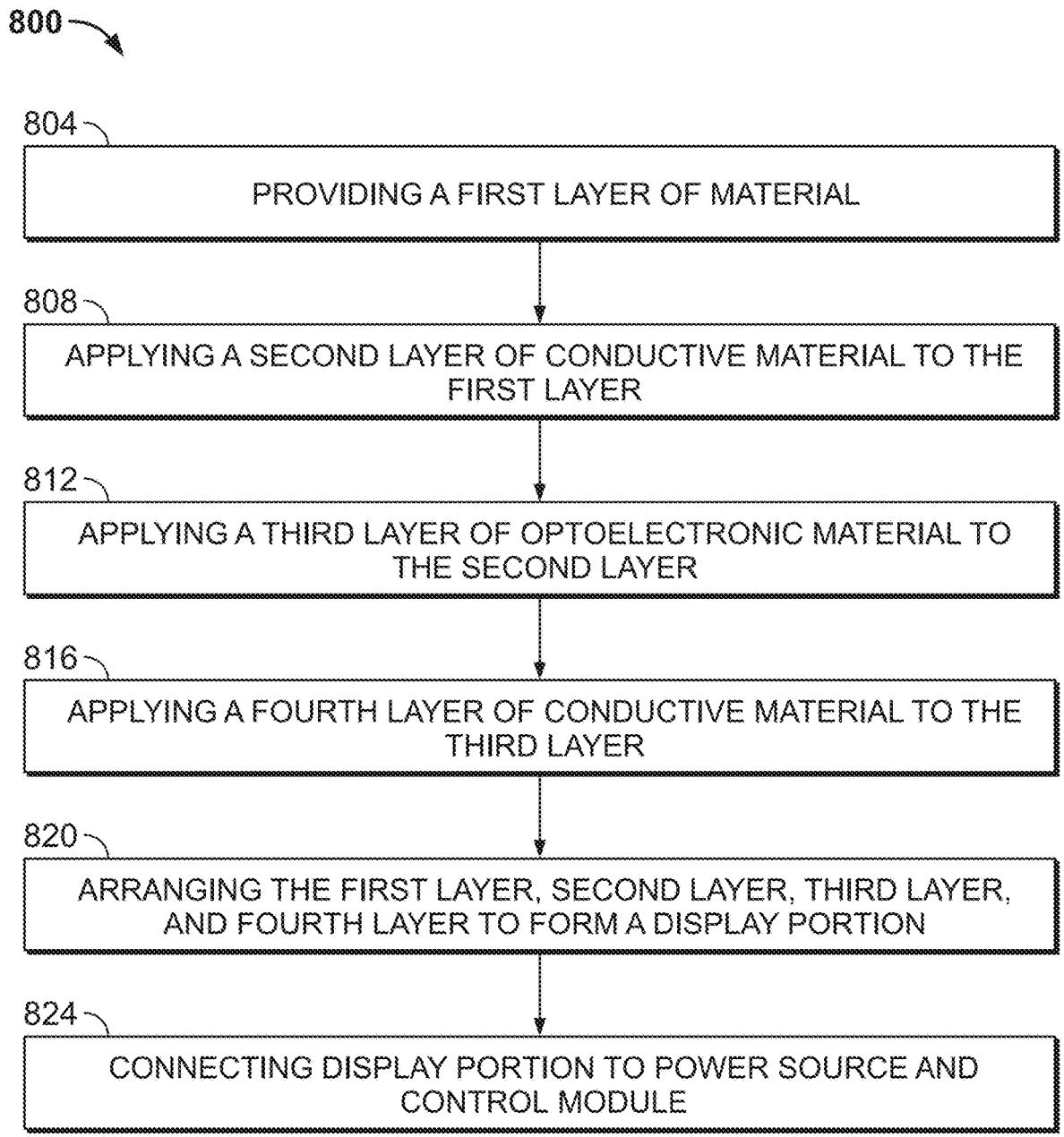
FIG. 22 is an example flowchart illustrating another method of assembling a display portion according to an embodiment of the present disclosure.

FIG. 22 illustrates another method 800 of assembling the display portion 190, 512 for the article of footwear 100, 500. Step 804 of the method 800 includes providing the substrate 308 as a first layer of material. In some embodiments, the first layer includes the fiber strands 226 (see FIG. 12) or the inner layer 348 (see FIG. 14). Step 808 of the method 800 includes applying the core electrode 224 to the substrate 308 as a second layer of conductive material. In some embodiments, the second layer of conductive material includes the outer electrode 298. In some embodiments, applying the core electrode 224 to the substrate 308 involves attaching or coupling or adhering or fastening or printing. Step 812 of the method 800 includes applying the optoelectronic layer 280 to the core electrode 224 and/or to the outer electrode 298. In some embodiments, the optoelectronic layer 280 is applied directly to the core electrode 224 or the outer electrode 298, or both, as a third layer of optoelectronic material. In some embodiments, the optoelectronic layer 280 is applied indirectly to the core electrode 224 or the outer electrode 298, or both, such that material, e.g., fabric 226, is positioned therebetween. Step 816 of the method 800 includes applying the outer electrode 298 to the optoelectronic layer 280 as a fourth layer comprising a conductive material. In some embodiments, the core electrode 224 is applied to the optoelectronic layer 280 as the fourth layer of conductive material. Step 820 of the method 800 includes arranging the first layer, the second layer, the third layer, and the fourth layer to form the display portion 190, arranged in that order moving outwardly toward an exterior of the display portion 190. In some embodiments, the first layer, the second layer, the third layer, and the fourth layer are arranged to form the display portion 190 in that order moving inwardly toward an interior of the display portion 190. In some embodiments, the third layer comprises the woven textile 240 or the knitted textile 260, or some combination thereof. In Step 824, the display portion 190 is connected to the storage cell 390 and the control module 374 provided in the sole structure 104 of the article of footwear 100. It will be appreciated that the method 800 may be similarly employed to form the display 512 of the article of footwear 500.

In some embodiments, the second layer, i.e., conductive material, is printed on the first layer, i.e., non-conductive material. For example, the outer electrode 298 may be printed on the fabric 226. Further, the fourth layer, i.e., conductive material, may be printed on the third layer, i.e., optoelectronic material or visual display technology. For example, the outer electrode 298 may be printed on the optoelectronic layer 280.

In other embodiments, other configurations are possible. For example, certain features and combinations of features that are presented with respect to particular embodiments in the discussion above can be utilized in other embodiments and in other combinations, as appropriate. Further, any of the embodiments described herein may be modified to include any of the structures or methodologies disclosed in connection with other embodiments. Additionally, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A display system for an article of footwear, the display system comprising:
   a display portion that is comprised of a plurality of optoelectronic fibers;
   a control module that is configured to communicate with the display portion; and
   a power source, wherein the plurality of optoelectronic fibers each include a fabric layer disposed between a core electrode and an optoelectronic layer,
   wherein the display portion is provided on an upper, and
   wherein the upper includes a mesh portion that is disposed between a first display portion and a second display portion.

2. The display system of claim 1, wherein the plurality of optoelectronic fibers includes an outer electrode, wherein the optoelectronic layer is positioned between the outer electrode and the core electrode.

3. The display system of claim 2, wherein the optoelectronic layer comprises electrophoretic ink.

4. The display system of claim 1, wherein the power source is provided within a heel region of a sole structure.

5. The display system of claim 1, wherein the optoelectronic fibers each include a conductive end disposed along a periphery of the upper.

6. The display system of claim 1, wherein a thin-film transistor is provided between the display portion and the power source.

7. The display system of claim 1, wherein the display portion is configured to include at least one of a knitted textile, a woven textile, or a non-woven textile.

8. A display system for an article of footwear, comprising:
   an upper including a first yarn and a second yarn, the first yarn comprising an optoelectronic layer and the second yarn comprising a core electrode, wherein a textile is formed by the first yarn and the second yarn, and wherein an electrical contact is provided on the upper; and
   a sole structure including an electrical circuit comprising a power source, a control module, and a conductive lead in communication with a periphery of the sole structure,
   wherein the periphery of the sole structure is joined with a periphery of the upper, and wherein the electrical contact of the upper is operably connected to the power source, and
   wherein the upper includes a mesh portion that is disposed between a first display portion and a second display portion.

9. The display system of claim 8, wherein the sole structure includes a multicomponent midsole having a plate.

10. The display system of claim 9, wherein the control module is accessible from an exterior of the article of footwear.

11. The display system of claim 10, wherein the electrical circuit is printed on the plate.

12. The display system of claim 11, wherein the electrical circuit provides power to the first yarn and the second yarn of the upper.

13. The display system of claim 8, wherein the optoelectronic layer comprises electrophoretic ink.

14. The display system of claim 8, wherein the textile is a woven textile.

15. A display system for an article of footwear, comprising:
   a display device that includes a yarn comprising electrophoretic ink;
   a control module that is configured to communicate with the display device; and
   a power source that is embedded within a midsole of the article of footwear, wherein the midsole includes a plate,
   wherein the display device is visible from an exterior of the article of footwear,
   wherein the control module is operable from the exterior of the article of footwear,
   wherein the display device is electrically connected with the control module,
   wherein a display portion is provided on an upper, and
   wherein the upper includes a mesh portion that is disposed between a first display portion and a second display portion.

16. The display system of claim 15, wherein the control module communicates with a control unit over a wireless communication network to allow a user to manipulate the display device, and the control unit is configured to receive inputs from an input device that is mounted on the footwear and is capable of voice-activation for controlling an aspect of the display device.

17. The display system of claim 15, wherein the plate comprises carbon fiber.

18. The display system of claim 15, wherein a piezoelectric transducer is connected to a storage cell, and the piezoelectric transducer harvests energy from pressure generated within a heel region of the article of footwear to provide electricity to the display device.

19. The display system of claim 15, wherein the plate comprises a thin-film transistor.

20. A method of assembling a display for an article of footwear, the method comprising:
   providing a first yarn and a second yarn, wherein the first yarn includes a core electrode;
   coating the first yarn with an electrophoretic ink and a conductive material;
   forming the first yarn and the second yarn into a textile;
   applying the textile to a substrate to form the display, wherein the substrate comprises a non-conductive material;

arranging the display to form at least a portion of an upper of the article of footwear; and connecting a power source and a control module to a contact positioned on the upper to operate the display, wherein the substrate includes an insulation member disposed between an outer layer adjacent the textile and an inner layer that is adjacent an interior cavity of an upper.

21. The method of claim 20, wherein the core electrode of the first yarn is one of a multifilament core or a monofilament core.

22. The method of claim 20, wherein the electrophoretic ink is disposed adjacent an outer layer, and wherein the outer layer comprises the conductive material.

23. The method of claim 20, wherein the textile is formed by way of warp knitting, weft knitting, flat knitting, or circular knitting.

24. The method of claim 20, wherein the power source and control module are disposed within a sole structure.

25. The method of claim 20, wherein the contact includes a first contact and a second contact, the first contact being connected to a core electrode of the first yarn, and the second contact being connected to an outer electrode of the first yarn.

26. The method of claim 20, wherein a field-effect transistor is positioned between the power source and the conductive material.

27. A method of assembling a display for an article of footwear, the method comprising:

providing a first layer of non-conductive material;

applying a second layer comprising a conductive material to the first layer; applying a third layer comprising electrophoretic ink to the second layer;

applying a fourth layer comprising a conductive material to the third layer, wherein the first layer, the second layer, the third layer, and the fourth layer comprise the display, wherein the third layer comprises a textile, and wherein the display is connected to a power source and a control module provided in a sole structure of an article of footwear; and applying the textile of the third layer to a substrate to form the display, wherein the substrate includes a non-conductive material, wherein the substrate includes an insulation member disposed between an outer layer adjacent the textile and an inner layer that is adjacent an interior cavity of an upper.

28. The method of claim 27, wherein the second layer is printed on the first layer and the fourth layer is printed on the third layer.

29. The method of claim 28, wherein the electrophoretic ink is coated on the textile.

30. The method of claim 28, wherein a transducer is applied to the display and connected to the power source.

31. The method of claim 30, wherein a field-effect transistor is provided between the display and the power source.

32. The method of claim 27, wherein the textile of the third layer is formed by way of warp knitting, weft knitting, flat knitting, or circular knitting.

33. The method of claim 32, wherein the textile of the third layer comprises a plurality of yarn and wherein each yarn is coated with the electrophoretic ink prior to being formed into the textile.

34. The method of claim 27, wherein the power source includes a piezoelectric transducer.

* * * * *